United States Patent [19]
Masreliez et al.

[11] Patent Number: 6,002,250
[45] Date of Patent: *Dec. 14, 1999

[54] ELECTRONIC LINEAR SCALE USING A SELF-CONTAINED, LOW-POWER INDUCTIVE POSITION TRANSDUCER

[75] Inventors: Karl G. Masreliez, Bellevue; Nils Ingvar Andermo; Kim W. Atherton, both of Kirkland, all of Wash.

[73] Assignee: Mitutoyo Corporation, Kawasaki, Japan

[*] Notice: This patent is subject to a terminal disclaimer.

[21] Appl. No.: 08/645,490

[22] Filed: May 13, 1996

[51] Int. Cl.⁶ .............................. G01B 7/02; G01B 7/14; G01D 5/20

[52] U.S. Cl. .............................. 324/207.16; 324/207.24; 324/207.17; 340/870.32; 336/45

[58] Field of Search .................. 324/207.15–207.26; 340/870.31, 870.32, 870.33, 870.35, 870.36; 336/130–135, 45, 136; 318/653, 654, 655, 657, 656

[56] References Cited

U.S. PATENT DOCUMENTS

| | | | |
|---|---|---|---|
| 2,905,874 | 9/1959 | Kelling | 324/207.17 |
| 3,208,269 | 9/1965 | Eccles et al. | 324/207.24 |
| 3,502,968 | 3/1970 | Tobin, Jr. et al. | 324/243 |
| 3,688,187 | 8/1972 | Loos | 324/224 |

(List continued on next page.)

FOREIGN PATENT DOCUMENTS

| | | |
|---|---|---|
| 0-009-102-A1 | 4/1980 | European Pat. Off. . |
| 0 286 820 | 10/1988 | European Pat. Off. . |

(List continued on next page.)

OTHER PUBLICATIONS

"Digital Position Readout System, Magnescale GS–E/GS–1 Series, Scale Unit SR10–005A–125A/SR15–005A–125A, Cable Unit HK–403C,405C, Instructional Manual", Sony, pp. 1–15, 1983.

"Linear Transducers For Position Feedback", A. Hitchcox, Hudraulics & Pneumatics, Mar. 1991.

Inductosyn, Heidenhain, Nov. 1988, pp. 1–16.

"The Soviet Journal of Nondestructive Testing", vol. 22, No. 10, Oct., 1986–Jun., 1987, pp. 696–702.

(List continued on next page.)

Primary Examiner—Jay M. Patidar
Attorney, Agent, or Firm—Oliff & Berridge, PLC

[57] ABSTRACT

An electronic linear scale, which uses an induced current position transducer, includes a slider assembly mounted adjacent to an elongated beam. The slider assembly is mounted on one mounting member of a device such as a machine tool. The elongated beam is mounted on a second mounting member of the device. The first and second mounting members move relative to each other. The position of the slider assembly on the beam is indicative to of the position between the first and second mounting members. Relative movement is determined by an inductive read head mounted on the slider assembly that couples to flux modulators on the beam. The read head includes a transmitter winding and a pair of receiver windings, preferably fabricated in a planar form, carried by a common printed circuit board. The flux modulators, which can include flux disrupters and/or flux enhancers, are carried by the beam and modulate the magnetic fields produced by the transmitter. Thus, the receiver windings produce output voltages corresponding to the overlap between the modulators and the receiver windings. Signal processing electronics are connected to the read head and determine the relative positions of the first and second mounting members by monitoring the output of the receiver windings. A digital display displays the determined position. The relatively insensitive nature of the induced current position transducer to contaminants allows the linear scale to function with improved reliability when operating in industrial environments. Low power operation of the linear scale is possible.

36 Claims, 23 Drawing Sheets

U.S. PATENT DOCUMENTS

| | | | |
|---|---|---|---|
| 3,699,558 | 10/1972 | Hendley et al. | 340/870.32 |
| 3,816,003 | 6/1974 | Litke | 356/395 |
| 3,882,437 | 5/1975 | Geller | 336/123 |
| 3,936,734 | 2/1976 | Brandli et al. | 329/243 |
| 3,955,073 | 5/1976 | Carew et al. | 364/561 |
| 3,971,982 | 7/1976 | Tornblom | 324/225 |
| 4,042,876 | 8/1977 | Visioli, Jr. | 324/207.16 |
| 4,063,362 | 12/1977 | Amsbury et al. | 33/793 |
| 4,100,485 | 7/1978 | Rogers | 324/200 |
| 4,103,222 | 7/1978 | Phillips et al. | 324/207.17 |
| 4,112,365 | 9/1978 | Larson et al. | 324/173 |
| 4,127,814 | 11/1978 | Rasigade et al. | 324/207.22 |
| 4,150,352 | 4/1979 | Pomella et al. | 336/129 |
| 4,210,865 | 7/1980 | Nikolaev et al. | 324/207.17 |
| 4,226,024 | 10/1980 | Westerberg et al. | 33/783 |
| 4,229,883 | 10/1980 | Kobashi | 33/784 |
| 4,249,630 | 2/1981 | Lougheed et al. | 324/207.16 |
| 4,420,754 | 12/1983 | Andermo | 324/660 |
| 4,425,511 | 1/1984 | Brosh | 324/207.16 |
| 4,551,847 | 11/1985 | Caldwell | 377/24 |
| 4,627,280 | 12/1986 | Hayashi et al. | 73/290 R |
| 4,648,041 | 3/1987 | Tarr | 364/481 |
| 4,652,821 | 3/1987 | Kreft | 324/207.23 |
| 4,658,134 | 4/1987 | Okumura | 250/230 |
| 4,678,994 | 7/1987 | Davies | 324/236 |
| 4,697,144 | 9/1987 | Howbrook | 324/207.17 |
| 4,717,874 | 1/1988 | Ichikawa et al. | 324/207.16 |
| 4,733,023 | 3/1988 | Tamaru et al. | 178/20 |
| 4,737,698 | 4/1988 | McMullin et al. | 318/653 |
| 4,737,709 | 4/1988 | Loftus | 324/226 |
| 4,743,786 | 5/1988 | Ichikawa et al. | 324/207.17 |
| 4,747,215 | 5/1988 | Waikas | 33/140 |
| 4,757,244 | 7/1988 | Iwamoto et al. | 318/652 |
| 4,812,757 | 3/1989 | Meins et al. | 324/225 |
| 4,816,759 | 3/1989 | Ames et al. | 324/233 |
| 4,853,604 | 8/1989 | McMullin et al. | 318/653 |
| 4,879,508 | 11/1989 | Andermo | 324/690 |
| 4,882,536 | 11/1989 | Meyer | 324/671 |
| 4,890,392 | 1/1990 | Komura et al. | 33/762 |
| 4,893,071 | 1/1990 | Miller | 324/660 |
| 4,893,077 | 1/1990 | Auchterlonie | 324/207.17 |
| 4,991,301 | 2/1991 | Hore | 33/366 |
| 5,027,526 | 7/1991 | Crane | 33/763 |
| 5,036,275 | 7/1991 | Munch et al. | 324/207.17 |
| 5,107,212 | 4/1992 | Dobler et al. | 324/207.16 |
| 5,109,193 | 4/1992 | Pike | 324/207.17 |
| 5,111,412 | 5/1992 | Tornblom | 324/225 |
| 5,172,485 | 12/1992 | Gerhard et al. | 33/706 |
| 5,175,497 | 12/1992 | Dobler et al. | 324/207.25 |
| 5,200,698 | 4/1993 | Thibaud | 324/207.22 |
| 5,225,830 | 7/1993 | Andermo et al. | 341/13 |
| 5,233,294 | 8/1993 | Dreoni | 324/207.16 |
| 5,260,651 | 11/1993 | Tischer et al. | 324/207.16 |
| 5,280,239 | 1/1994 | Klimovitsky et al. | 324/207.26 |
| 5,291,782 | 3/1994 | Taylor | 324/207.24 |
| 5,331,277 | 7/1994 | Burreson | 324/207.16 |
| 5,369,890 | 12/1994 | Malz | 33/810 |
| 5,416,396 | 5/1995 | Takei | 324/207.24 |
| 5,477,621 | 12/1995 | Koizumi et al. | 33/784 |
| 5,635,833 | 6/1997 | Onodera et al. | 324/207.24 |

FOREIGN PATENT DOCUMENTS

| | | |
|---|---|---|
| 0 743 508 A2 | 11/1996 | European Pat. Off. . |
| 647-316-A5 | 1/1985 | Sweden . |
| 847158 | 9/1960 | United Kingdom . |
| 1002174 | 8/1965 | United Kingdom . |
| 1006691 | 10/1965 | United Kingdom . |
| 1169155 | 10/1969 | United Kingdom . |
| 2-064-125 | 6/1981 | United Kingdom . |
| 2-223-590 | 9/1988 | United Kingdom . |
| 2-241-788 | 4/1991 | United Kingdom . |

OTHER PUBLICATIONS

"General Catalog, Precision Graduations Linear Encoders Rotary Encoders Angle Encoders Digital Readouts Numerical Controls", Heidenhain, Nov. 1993, pp. 1–51.

"NC Linear Encoders", Heidenhain, Sep. 1993, pp. 1–14.

"Inductosyn Position Transducers For Commercial and Industrial Applications", Farrand date not available.

OUTPUT SIGNAL AMPLITUDE AND POLARITY
BETWEEN TERMINALS
$V^+$ AND $V^-$

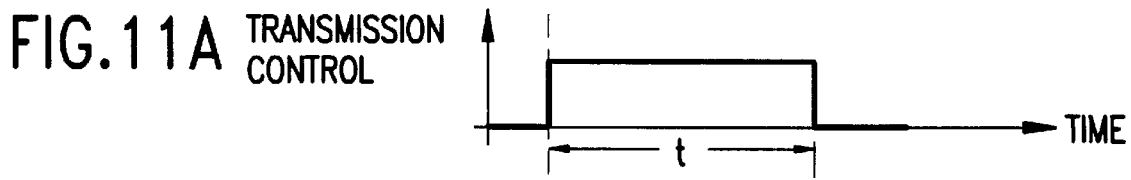
FIG.11A TRANSMISSION CONTROL
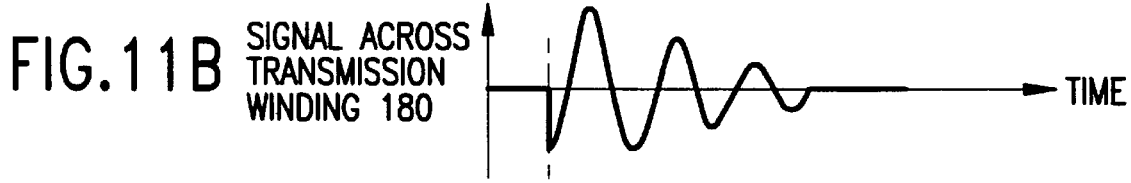
FIG.11B SIGNAL ACROSS TRANSMISSION WINDING 180
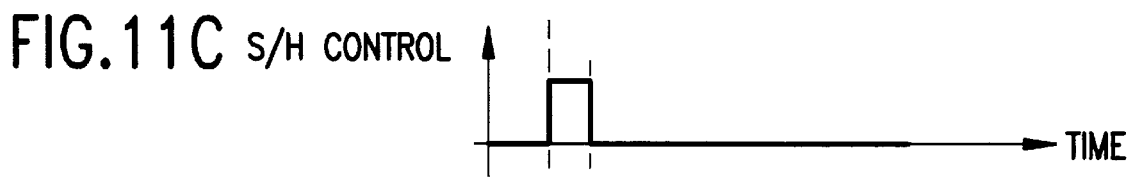
FIG.11C S/H CONTROL
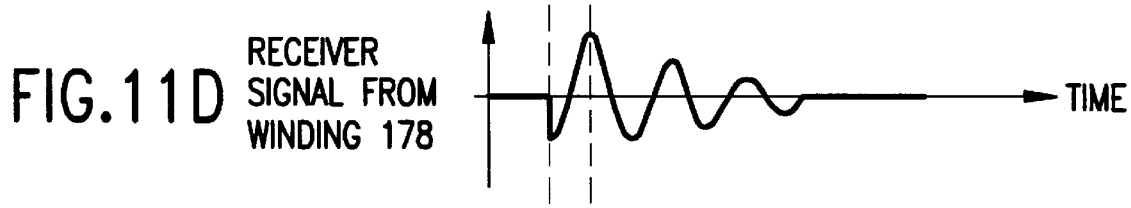
FIG.11D RECEIVER SIGNAL FROM WINDING 178
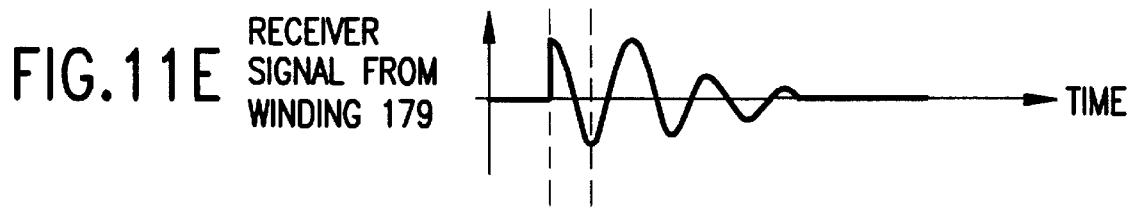
FIG.11E RECEIVER SIGNAL FROM WINDING 179
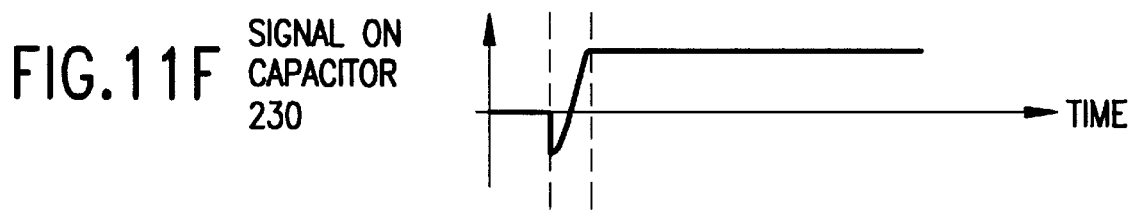
FIG.11F SIGNAL ON CAPACITOR 230
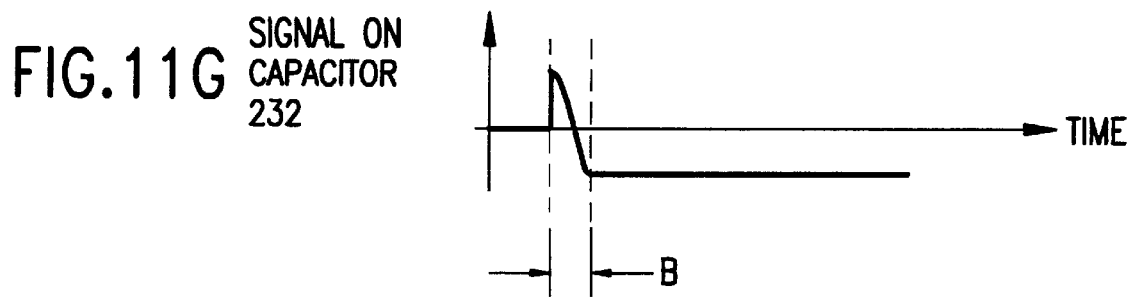
FIG.11G SIGNAL ON CAPACITOR 232

FIG.12A  TRANSMISSION CONTROL
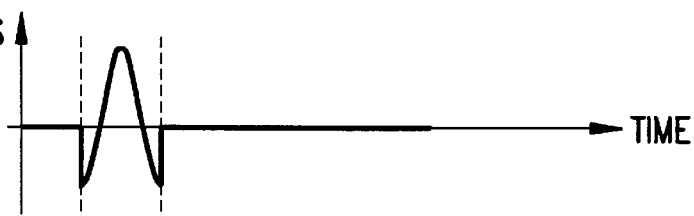
FIG.12B  SIGNAL ACROSS TRANSMISSION WINDING 180
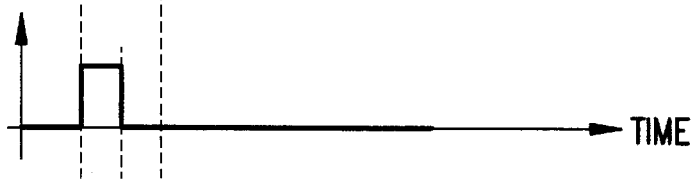
FIG.12C  S/H CONTROL
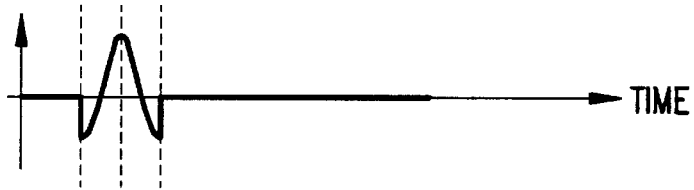
FIG.12D  RECEIVER SIGNAL FROM WINDING 178
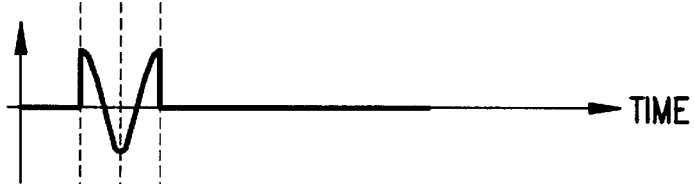
FIG.12E  RECEIVER SIGNAL FROM WINDING 179
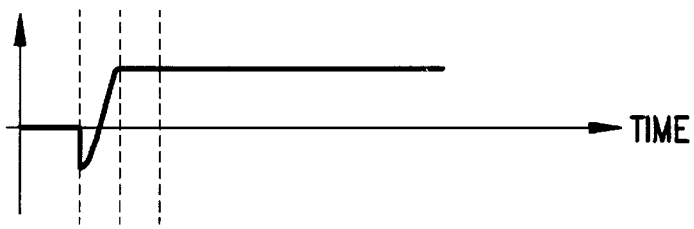
FIG.12F  SIGNAL ON CAPACITOR 230
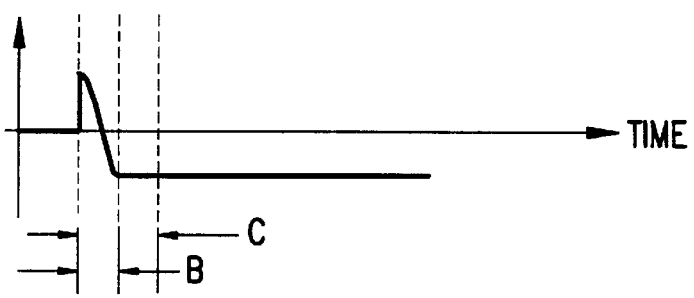
FIG.12G  SIGNAL ON CAPACITOR 232

ELECTRONIC LINEAR SCALE USING A SELF-CONTAINED, LOW-POWER INDUCTIVE POSITION TRANSDUCER

BACKGROUND OF THE INVENTION

1. Field of the Invention

This invention relates to an electronic linear scale, and more particularly, to electronic linear scales employing inductively coupled transducer elements.

2. Description of Related Art

Electronic linear scales are common in the manufacturing industry and wherever high precision measurements are required. Linear scales are often affixed to equipment such as drill presses, lathes, saws, numerically controlled and automated machinery. The linear scale allows these machines to produce goods with a high level of precision.

These scales have used transducers based on optical systems, magnetic scales, inductive transformation, and capacitive devices.

Conventional linear scales have used optical technology with incremental and absolute measurement systems. Problems with this system include a relatively high power requirement, high manufacturing cost due to the precise mechanical tolerances required, and sensitivity to contaminants. To make a measurement, the optical system used a self-contained lamp directed at an optical scale and transmitted through (or reflected) to an optical receiver. The lamp involved in this system usually consumes more energy than is practicably provided by conventional batteries. This reduces the portability and ease of installation of the linear scale. Because the lamp and the optical receiver traverse the scale during a measurement, this linear scale requires a precise guiding track to guide and support the optical components. This track must to constructed with close tolerances and the optical receiver must be precisely aligned, so that the image reflected off the optical scale is focused onto the optical receiver. Due to the close assembly tolerances required, the bearing system used in the device, and the cost of the optical-grade components, the optical systems have high manufacturing costs. Additionally, the effects of wear or poor alignment significantly degrade the performance.

Capacitive transducers draw very little current. Therefore, when used in battery-powered measurement devices, they provide portability and ease of installation. Capacitive transducers operate under a parallel plate capacitor model. Within the capacitive transducer, a transmitter electrode and a receiver electrode are mounted on or in a slide. The transmitter electrode is connected to appropriate signal generating circuitry. The receiver electrode is connected to appropriate read circuitry.

The slide moves along a scale. The scale includes a plurality of spaced-apart signal electrodes, which extend along the length of the scale. As the slide moves relative to the scale, the transmitter and receiver electrodes on the slide capacitively couple to the signal electrodes on the scale. The read circuitry determines the movement or position of the slide relative to the scale. The read circuitry compares the phase of at least one signal coupled to a receiver electrode with the phase of at least one signal coupled to a transmitter electrode.

The capacitive position transducer may be an incremental type transducer or may be an absolute position type transducer. In the incremental type capacitive position transducer, the read circuitry provides only an indication of relative movement from a known point. In the absolute position type capacitive position transducer, the read circuitry provides an indication of the absolute position between the slide and scale regardless of any knowledge of the initial position. Incremental and absolute position type position transducers are disclosed in U.S. Pat. Nos. 4,420,754 and 4,879,508.

These capacitive position transducers are sometimes used in dry, relatively clean environments, such as in inspection rooms or engineering offices. However, these capacitive position transducers are desirably usable in electronic linear scales to measure dimensions in machine shops and other relatively contamination-filled environments. In these environments, capacitive linear scales can become contaminated by particulate matter and fluids, such as metal particles, grinding dust, and cooling or cutting fluids. The liquid or particulate contaminants find their way between the signal electrodes on the scale and the transmitter and/or receiver electrodes on the slide. The contaminants alter the capacitance between the signal electrodes and the transmitter and/or receiver electrodes in a manner unrelated to the position of the slide relative to the scale. In general, contaminants between the signal electrodes and the transmitter electrodes and/or the receiver electrodes of a capacitive position transducer cause measurement errors through three different mechanisms. Primarily, the particulate or liquid may have a dielectric constant different from the dielectric constant of air. In this case, the capacitance between the signal electrodes and the transmitter/receiver electrodes sandwiching the contaminant will be greater than the capacitance between other ones of the signal and transmitter/receiver electrodes having the same relative geometry which do not have contaminants between them. As a result, the capacitive linear scale will not provide an accurate indication of the position of the slide relative to the scale.

Secondarily, the contaminants may have a relatively high conductivity. Normally, the signal and transmitter/receiver electrodes form an open circuit, such that no current flows between them. A conductive contaminant between the signal and transmitter or receiver electrodes closes this circuit. In particular, the contaminant forms the resistive element of an RC circuit. The time constant of the RC circuit is a function of both the conductivity of the contaminant and the capacitance between the signal electrode and the transmitter and/or receiver electrodes. When the time constant is relatively short, the amplitude of the signal may decay so rapidly that the conventional circuitry employed in capacitive position transducers cannot properly sense the signal.

Thirdly, electrically conductive particles between the signal electrode and the transmitter and/or receiver electrodes may alter the field extending between the signal electrode and the transmitter and/or receiver electrodes. This changes the capacitance between the signal electrode and the transmitter and/or receiver electrodes. Distortions in the electric field may also distort the signals between the signal electrode and the transmitter and/or receiver electrodes. As a result, the capacitive linear scale circuitry does not provide an accurate indication of the position of the slide relative to the scale.

U.S. Pat. No. 5,172,485 to Gerhard et al. describes one approach to minimizing the adverse effects of contaminants in capacitive position transducers. This approach comprises coating the electrodes with a thin layer of dielectric material. The slide is then mounted on the scale so that the dielectric coating on the slide (transmitter and receiver) electrodes is positioned adjacent to the dielectric coating on the scale (signal) electrodes. That is, placing the dielectric coatings between the signal electrodes and the transmitter and receiver electrodes minimizes these adverse effects. In addition, the dielectric coating on the slide slidingly contacts the dielectric coating on the scale. The sliding contact between the dielectric coatings reduces the gap between the slide and the scale into which the contaminants intrude.

The sliding contact approach requires that the electrodes be resiliently biased toward each other. The resilient bias accommodates deviations from exact surface flatness and alignment by permitting the electrodes to move apart from each other. This allows the dielectric layers to be forced apart from each other. Thus, when using such a capacitive position transducer in a highly contaminated environment, contaminants can force the slide away from the scale, collecting between the slide and scale. Thus, this approach is inadequate under some circumstances.

However, using thick dielectric coats, rather than the thin coats taught by Gerhard et al., has reduced, to some extent, the negative effects due to contaminants collecting between the slide and scale. The thick dielectric coats create a pair of capacitors connected in series with the capacitance created by the contaminants. The capacitance created by the dielectric coats does not vary as the slide moves along the scale. Thus, the change in capacitance between the signal electrodes and the transmitter and/or receiver electrodes resulting from changes in the thickness or the composition of the contaminants is dominated by the fixed capacitances created by the thick dielectric coats. Although using thick dielectric coats can reduce the problem caused by dielectric contaminants, this approach cannot completely eliminate the problem.

Another approach isolates the electrodes from the liquid and particulate contaminants. For example, the capacitive position transducer linear scale may be sealed. However, sealing the linear scale increases the fabrication and assembly costs and is often unreliable. Also, such seals are difficult to practically apply to all sizes and applications of electronic linear scales.

Magnetic transducers are alternative types of position measuring transducers. Magnetic transducers are relatively insensitive to contamination caused by oil, water and other fluids. Magnetic transducers, such as the Sony Magnescale encoders, employ a read head that detects magnetic fields and a ferromagnetic scale selectively magnetized with one or more periodic magnetic patterns. The read head senses changes in the magnetic field as the read head moves relative to magnetic scale patterns on the scale. However, magnetic transducers themselves are affected by small particles, particularly ferromagnetic particles attracted to the magnetized scale. Consequently, magnetic transducers must also be sealed, encapsulated or otherwise protected to keep contaminants from affecting their accuracy. Magnetic transducers also do not offer the very low power consumption desired for some applications of electronic linear scales.

Inductive transducers, in contrast to both capacitive and magnetic transducers, are highly insensitive to cutting oil, water or other fluids as well as to dust, ferromagnetic particles, and other contaminants. Inductive transducers, such as the INDUCTOSYN® type transducers, employ multiple windings on one member to transmit a varying magnetic field received by similar windings on another member. The multiple windings can be a series of parallel hairpin turns repeated on a printed circuit board. An alternating current flowing in the windings of the first member generates the varying magnetic field. The signal received by the second member varies periodically based on the relative position between the two members. A position determining circuit connected to the varying signal from the second member can determine the relative position between the first and second members. However, both members are active. Therefore, each member must be electrically coupled to the appropriate driving circuitry. This coupling is typically achieved by wired connections. When a moving wire connection must be attached and routed for free movement, the reliability of the unit is generally lower while the maintenance cost and production cost of the unit are higher. Sometimes an electrical coupling approach based on transformers is used in place of wire connections to the scale elements. This approach may reduce signal quality and accuracy, and may require additional size and cost to accommodate the placement of coupling elements on the scale and read head. Moreover, such a system would usually consume more energy than can be practically provided with conventional batteries, reducing the portability and the ease of installation.

Other motion or position transducers that are insensitive to contaminants are described in U.S. Pat. No. 4,697,144 to Howbrook, U.S. Pat. No. 5,233,294 to Dreoni, and 4,743, 786 to Ichikawa et al., and British Patent Application 2,064,125 to Thatcher. These references disclose position detection devices that sense position between an energized member and an inactive or unenergized member. The transducing systems described in these references eliminate electrical intercoupling between the two moving members, a drawback of inductive transducers. However, these systems generally fail to provide the high accuracy of inductive or capacitive transducers.

Additionally, in some of these transducing systems, the inactive member is preferably ferromagnetic, to produce a sufficiently strong magnetic field. Ferromagnetic members offer limited fabrication options, and may become magnetized in the presence of magnetic chucks, thereby attracting magnetic particle. Alternatively, the inactive member is moved within a magnetic field defined and concentrated by a complex structure formed in or on the active member. The transducing systems disclosed in these references also produce output signals that are discontinuous or are not a simply prescribed function of position. Such signals contribute to inaccurately determined relative positions. Generally, all of these systems fail to provide the combination of sufficient accuracy and extensive measuring range that is commercially demanded for linear scales.

SUMMARY OF THE INVENTION

This invention thus provides an electronic linear scale usable in harsh industrial and field environments. The electronic linear scale of this invention includes transducer elements that are substantially insensitive to particulate and fluid contaminants. The electronic linear scale of this invention retains the conventional form and operation of conventional electronic scales while featuring low power consumption.

The electronic linear scale of this invention is readily and inexpensively manufactured by using conventional fabrication techniques, such as printed circuit board technology. Furthermore, the transducer of this invention is insensitive to contamination by particles, including ferromagnetic particles, or oil, water, or other fluids. As a result, the transducer avoids using expensive environmental seals while remaining usable in most shop or field environments. A pulse-driven circuit of the electronic linear scale of this invention allows the inductive transducer to consume little power. Accordingly, the linear scale can derive a long operating life from a small battery or solar cell, and features increased portability and ease of installation. In addition, where the linear scale is powered primarily by a conventional, separate power source such as an electrical wall socket, the linear scale featuring a back-up power supply, such as a small battery or solar cell, does not require recalibration following failure of the conventional power source.

The linear scale includes a slider mounted adjacent to an elongated main beam in a conventional configuration. The main beam is mechanically coupled to an elongated scale that includes a set of magnetic field or flux modulators extending in a pattern along the length of the scale. The slider assembly includes a pickoff assembly. The read head is mounted to the pickoff assembly. The linear scale electronic system employs electrical connections only to the read head, not to the modulators. Relative movement between the main beam and the slider corresponds to the relative movement between the set of modulators and the read head, respectively.

Signal processing electronics are connected to the read head. The signal processing electronics indicate the relative position between the read head and the set of magnetic field or flux modulators as a function of the disruptive effect of the modulators on the signals produced and received by the read head. The electronic linear scale configuration of this invention preferably uses a low power inductive transducer with a read head that moves relative to the set of magnetic field or flux modulators. However, the electronic linear scale may also use other types of inductive transducers that are sufficiently accurate, use sufficiently low power, and are similarly insensitive to contaminants.

The inductive transducer of this invention includes a magnetic field source preferably having a first path of conductive material. The magnetic field source is able to produce a changing magnetic field or flux. At least one of the set of magnetic field or flux modulators is positioned within the changing magnetic field or flux. The modulators spatially vary the magnetic field or flux proximate to the set of magnetic field or flux modulators. A sensing conductor, formed within a thin zone, forms a periodic pattern of flux-receiving areas. The periodic pattern extends along a measuring axis and is positioned within the changing magnetic field or flux. The changing magnetic field or flux thus passively generates an electromotive force (EMF) across at least one output of the sensing conductor in response to the changing magnetic field or flux.

The at least one magnetic field or flux modulator and the periodic pattern of the sensing conductor move relative to each other from a first position to a second position. In the first position, a first portion of the periodic pattern overlaps the at least one magnetic field or flux modulator. In the second position, a second portion of the periodic pattern overlaps the at least one magnetic field flux modulator. That is, the at least one magnetic field or flux modulator varies the EMF from the first position to the second position.

The at least one magnetic field or flux modulator cooperates with the periodic pattern of the sensing conductor to produce an EMF amplitude across the output of the sensing conductor. This amplitude changes as a continuously varying periodic function of the relative position of the at least one magnetic field or flux modulator and the periodic pattern of the sensing conductor. In one embodiment, each one of the set of magnetic field or flux modulators is a flux disrupter formed by an electrically conductive plate. In another embodiment, each one of the set of magnetic field or flux modulators is a flux enhancer formed from a material having a high magnetic permeability. In another embodiment, the set of magnetic field or flux modulators includes at least one flux disrupter and at least one flux enhancer.

The sensing conductor is preferably formed by a plurality of first loops alternating with a plurality of second loops. The loops are formed of a conductive material. The first and second loops are positioned within the changing magnetic field. Each of the first loops produces a changing first signal component in response to the changing magnetic field. Likewise, each of the second loops produces a changing second signal component in response to the changing magnetic field.

The plurality of first and second loops and the set of magnetic field or flux modulators are movable relative to each other. In a first position, one or more of the first loops may be proximate to corresponding ones of the set of magnetic field or flux modulators, thus altering the first signal components generated by those first loops. In a second position, one or more of the second loops may be proximate to corresponding ones of the set of magnetic field or flux modulators, thus altering the second signal components produced by those second loops. The first and second signal components indicate the position of each of the first and second loops relative to the set of magnetic field or flux modulators.

Thus, this invention incorporates an inductive sensor with advantageous physical and electrical characteristics, accuracy, range, and power consumption into a practical linear scale. The linear scale is insensitive to both particle and liquid contaminants, and is therefore suitable for a wide variety of applications. These applications include portable and low power applications. In addition, the linear scale is accurate and relatively inexpensive to manufacture, assemble, and install, compared to conventional linear scales. These and other features and advantages of this invention are described in or are apparent from the following detailed description of the preferred embodiments.

BRIEF DESCRIPTION OF THE DRAWINGS

The preferred embodiments of the invention will be described in detail with reference to the following figures, wherein:

FIGS. 11A–G are signal timing diagrams showing voltages at selected locations in the encoder electronics of FIG. 8 during sampling;

FIGS. 12A–G are signal timing diagrams of voltages at selected locations in the encoder electronics of FIG. 8 where the control signal is truncated to reduce energy loss;

DETAILED DESCRIPTION OF PREFERRED EMBODIMENTS

Figure 1:
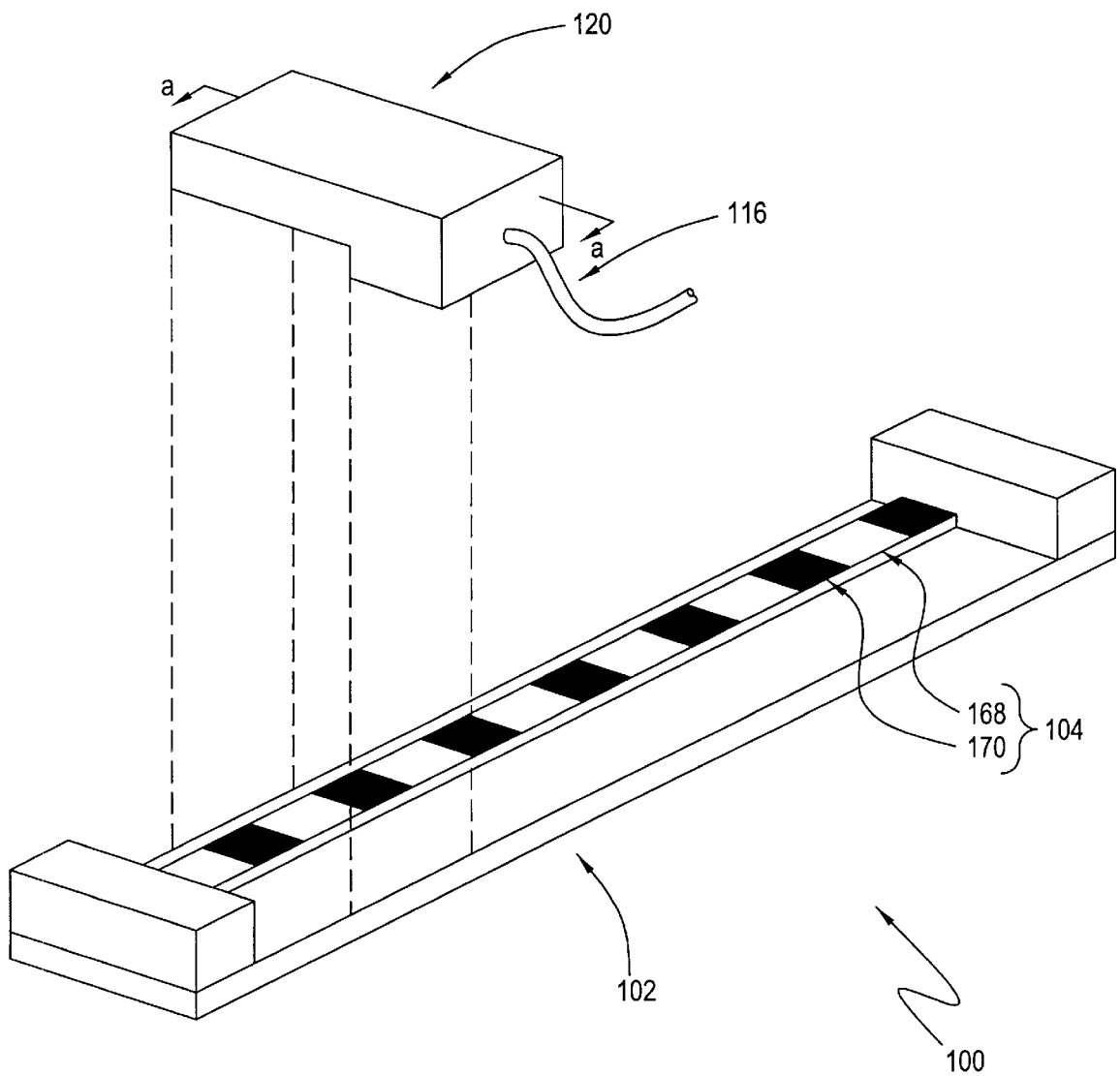
FIG. 1 is an isometric view of an electronic linear scale which contains a low power inductive position transducer.

As shown in FIG. 1, an inductive linear scale 100 includes an elongated beam 102 and a slider assembly 120. The beam 102 is a rigid or semi-rigid bar having a generally rectangular cross section.

During operation, the slider assembly 120 is installed in close proximity to scale 104 without contacting any components on the beam 102 or the beam 102 itself. Both the beam 102 and the slider assembly 120 may be affixed, in a variety of configurations, to other objects. In this manner, the linear scale 100 measures the position of the slider assembly 120 relative to the beam 102, thereby also measuring the distance between any mechanical fixtures attached to these two components.

Alternately, the scale 104 carrying modulators 170 may be fabricated of a flexible or rigid dimensionally stable material. The scale 104 can be applied directly to a mechanical fixture with clamps or adhesive, thus eliminating the beam 102. The scale 104 and the beam 102 are preferably, but not necessarily, non-conductive. The slider assembly 120 inductively monitors its own position relative to the scale 104.

The scale 104 is an elongated printed circuit board 168. As shown in FIG. 1, a set of disrupters 170 are spaced apart along the printed circuit board 168 in a periodic pattern. The disrupters 170 are preferably formed of copper. The disrupters 170 are preferably formed according to conventional printed circuit board manufacturing techniques, although many other methods of fabrication may be used. A display cable 116 is also shown in FIG. 1.

Figure 2:
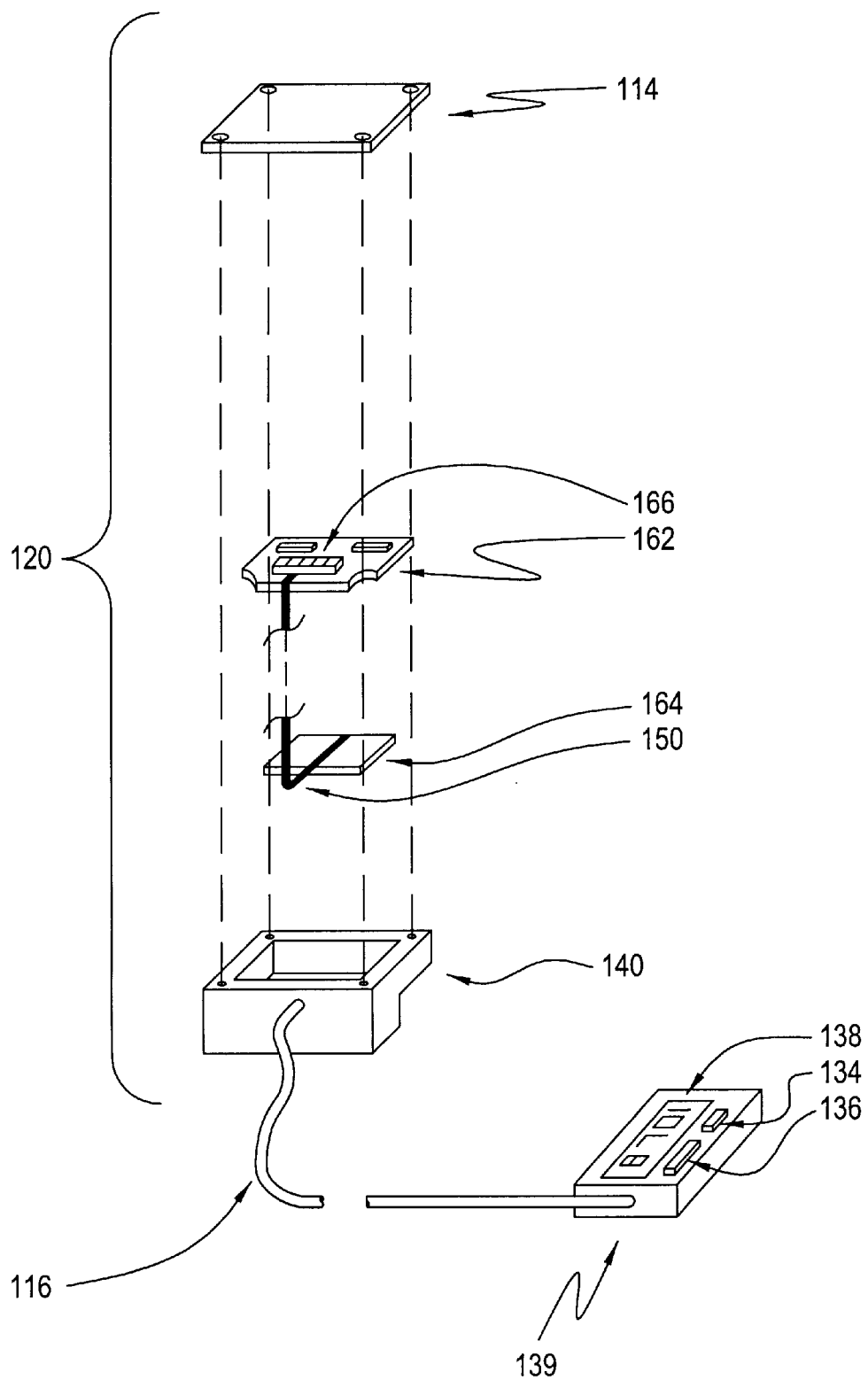
FIG. 2 is an exploded view of the slider of the linear scale and an associated digital display unit.

As shown in FIG. 2, the measurement generated by the linear scale is displayed on a conventional digital display 138 mounted on the digital display unit 139. A pair of push button switches 134 and 136 are also mounted on the digital display unit. The switch 134 turns on and off the signal processing electronics 166 and the digital display unit 139. The switch 136 resets the display 138 to zero. Alternately, the position information from the slider assembly may be routed to other types of electronic control systems or displays. The slider assembly 120 includes a slider housing 140, which holds the read head 164 to place the read head windings 178, 179 and 180 in close proximity to the modulators 170 on the beam 102 without making contact.

The slider assembly 120 also includes a substrate 162, such as a conventional printed circuit board. The signal processing electronics 166 are preferably mounted on an upper surface of the substrate 162, although a portion of the signal processing electronics may be placed on the interior side of read head 164, as an alternative (not shown). The contents of the slider housing are protected by a cover 114. A ribbon-like read head connector 150 electrically connects the read head 164 to the signal processing electronics 166. Display cable 116 is attached to signal processing electronics 166 inside the housing, by conventional means.

Figure 3:
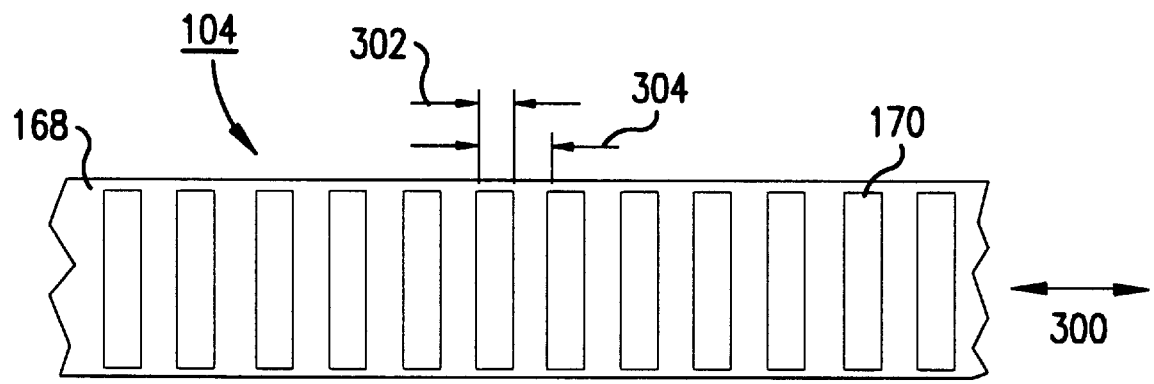
FIG. 3 is a cross-sectional view of the slider and the beam of the linear scale taken along line a—a of FIG. 1.

As shown in FIG. 3, the read head 164 windings are covered by a thin durable insulative coating 167. The insulative coating 167 is preferably approximately 50 $\mu$m thick. Alternatively, the insulative coating may be replaced by a membrane sealing the entire scale-facing surface of the slider housing 140. All external joints of the slider assembly 120 are sealed with adhesives (not shown) or other conventional means to prevent contaminants from contacting the electronic circuits.

The slider assembly 120 carries the read head 164 so that it is slightly separated from the beam 102 by an air gap 174 formed between the insulative coatings 167 and 172. The air gap 174 is preferably on the order of 0.4 mm. Together, the read head 164 and the disrupters 170 form an inductive transducer. The inductive transducer is preferably of any suitable type disclosed in U.S. patent application Ser. No. 08/441,769, which is incorporated herein by reference, and more particularly of the types described herein. However, the linear scale 100 can also use other types of inductive transducers that offer the necessary mechanical packaging attributes, are sufficiently accurate, are low power, and are similarly insensitive to contaminants. Power may be supplied to either the slider assembly 120, or the digital display unit 138, by conventional means (not shown) and routed therebetween through the display cable 116. Either battery power, power from solar cells, or conventional external power may be used. If the linear scale is battery or solar powered, the power conservation methods described in U.S. Provisional Patent Application 60/015,707, filed Apr. 17, 1996, can be used.

Figure 4:
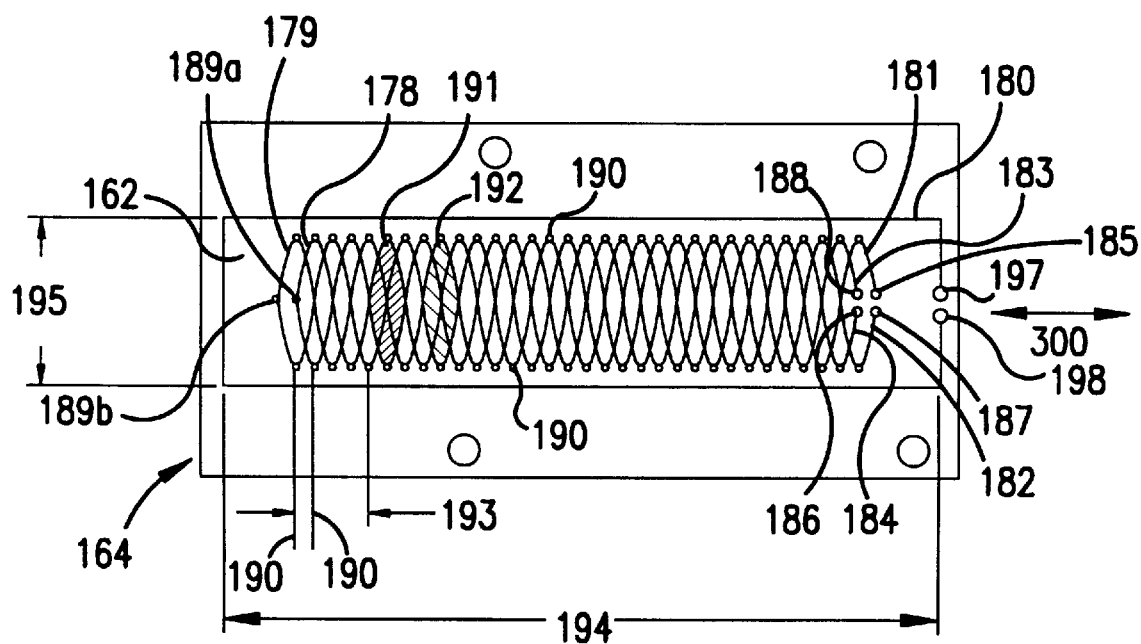
FIG. 4 is a plan view showing a layout of transmitter and receiver windings of a read head for an inductive position transducer, and corresponding disrupter scale elements.

FIG. 4 shows a section of the read head 164 in greater detail. The read head 164 preferably includes five substantially coplanar conductors 180–184. Two of the conductors 181 and 182 form a first receiver winding 178. Another two of the conductors 183 and 184 form a second receiver winding 179. The first and second receiver windings 178 and 179 are centrally located on and extend along the substrate of the read head 164 in an overlapped manner.

The first and second receiver windings 178 and 179 are each arranged in a sinusoidal pattern and have the same wavelength. The conductor 181 extends from a terminal 185 to an interconnection terminal 189a, where it connects to the conductor 182. The conductor 182 then extends back to a terminal 187. The conductors 181 and 182 forming the first receiver winding 178 define a plurality of sinusoidally shaped loops 191.

Similarly, the conductor 183 extends from a terminal 188 to an interconnection terminal 189b, where it connects to the conductor 184. The conductor 184 then extends back to a terminal 186. The conductors 183 and 184 forming the second receiver winding 179 also define a plurality of sinusoidally shaped loops 192. The loops 192 are offset by one-quarter wavelength or one-half of a loop from the loops 191 formed by the first receiver winding 178.

In FIG. 4, the conductors 181–184 are shown on the same surface of the substrate of the read head 164. However, alternate half wavelength sections of each of the conductors 181–184 are actually on separate layers of the substrate. Thus, the windings 178 and 179 do not physically contact each other. Similarly, each of the windings 178 and 179 do not physically contact themselves at the "crossover" points in the middle of the pattern. The half wavelength sections of each of the conductors 181–184 are then joined to other half wavelength sections of the same conductor by feedthroughs 190 extending through the substrate. While the conductors 181–184 are not on the same surface of the substrate, the conductors 181–184 lie within a thin zone. That is, the distance between the topmost layer of the windings 178 and 179 on the substrate and the bottommost layer of the substrate is minimal. Therefore, the conductors 181–184 are approximately coplanar.

The second receiver winding 179 is substantially identical to the first receiver winding 178, except for the spatial phase offset. Accordingly, the following discussion will focus primarily on the first receiver winding 178. It should be appreciated that the following discussion applies equally to the second receiver winding 179.

The fifth winding 180 is a transmitter winding that also lies within the thin zone and substantially encircles the first and second receiver windings 178 and 179. The transmitter winding 180 is also formed by a conductor on a layer or surface of the substrate of the read head 164. The transmitter winding 180 is also formed according to conventional printed circuit board manufacturing techniques. The transmitter winding 180 has a length 194 and a width 195 sufficient to encircle the first and second receiver windings 178 and 179. FIG. 4 also shows terminals 197 and 198 of the transmitter winding 180.

The inductive transducer formed by the read head 164 and the disrupters 170 operates, in the first preferred embodiment shown in FIGS. 1–4, by generating changing magnetic fields. The changing magnetic fields induce circulating currents, known as eddy currents, in the disrupters 170 placed within the changing magnetic field.

For example, one of the disrupters 170 is placed between the pole faces of an electromagnet. The magnetic field between the pole faces changes with time, such as when the electromagnet is driven by an alternating current. Then, the flux through any closed loop in the disrupter 170 will change. As a result, an electromotive force ("EMF") is induced around the closed loop. Since the disrupter 170 is a conductor, an eddy current is generated whose value equals the EMF divided by the resistance along the loop of the material from which the disrupter 170 is formed.

Such eddy currents are often produced in the magnetic cores of transformers. In transformers, such eddy currents are unwanted because they result in power loss and create heat that must be dissipated. In this invention, however, the existence of eddy currents has been applied to provide a beneficial result.

Figure 5:
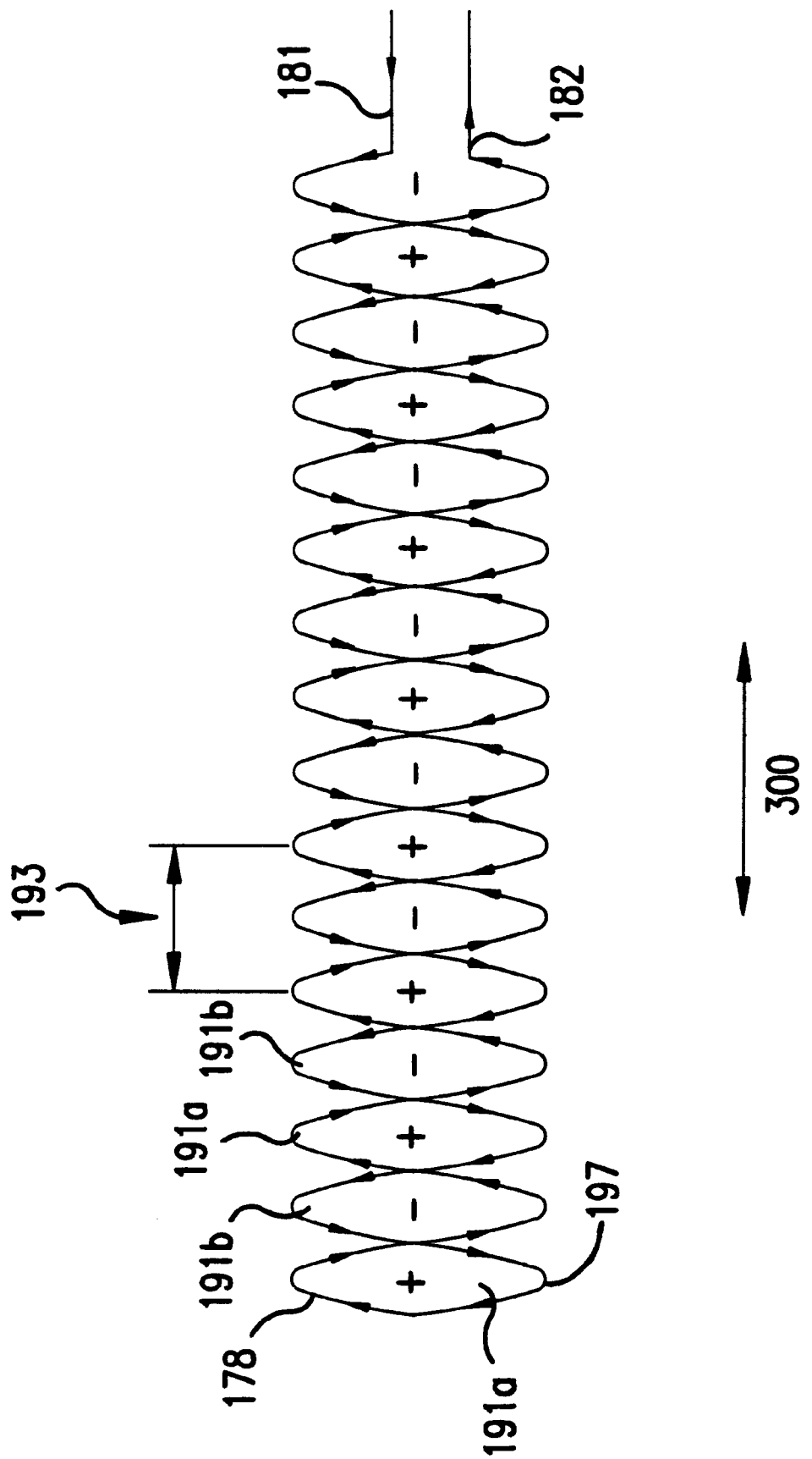
FIG. 5 is a plan view showing the alternating loops of one of the receiver windings of FIG. 4.

Except as otherwise specified, measurements in FIGS. 4 and 5 are defined relative to a measuring axis 300. "Length" generally refers to dimensions extending parallel to the measuring axis 300 and "width" generally refers to dimensions extending perpendicular to the measuring axis 300 in the plane of the substrate of the read head 164. The distance spanned by two adjacent loops 191 formed by the first receiver winding 178 or two adjacent loops 192 formed by the second receiver winding 179 is defined as the pitch or wavelength 193 of the read head 164. The distance spanned by a single loop 191 or 192 is equal to one-half of the wavelength 193. The distance 302 spanned by each disrupter 170 is preferrably also equal to one-half of the wavelength 193. The one-quarter wavelength offset between the first receiver winding 178 and the second receiver winding 179 produces signals in quadrature. Thus, the direction of motion of the read head 164 relative to the scale 104 is observable. Furthermore, the distance 304 spanned from one edge of a disrupter 170 to the corresponding edge of an adjacent disrupter 170 is preferably equal to the wavelength 193. It should be appreciated that if the disruptors all are substantially identical, the edge-to-edge distance 304 can be any integer multiple "K" of the wavelength 193. In the later case, it is preferable that each receiver winding have a length of "N*K" times wavelength 193, where N is also an integer. As shown in FIG. 5, the first receiver winding 178 has a sinusoidal pattern of loops 191. The first receiver winding 178 is formed by the conductors 181 and 182 laid out in one direction in a sinusoidal or zigzag pattern, and then in a reverse direction. Thus, the conductors 181 and 182 physically (but not electrically) cross over each other to form the loops 191. Alternately, the loops 191 can be created by twisting a loop of insulated wire clockwise or counterclockwise 180 degrees at regular increments along the loop. The construction of the second receiver winding 179 is identical to the first receiver winding 178.

As a result of the cross-over structure of the loops 191, adjacent ones of the loops 191 have different effective winding directions. An alternating current flowing through the transmitter winding 180 produces a uniform, time-varying magnetic field extending through the first receiver windings 178. The time-varying magnetic field generates an EMF in, or time-varying current through, the first receiver winding 178. Thus, the receiver winding 178 functions as a specialized magnetic flux sensor. Since adjacent ones of the loops 191 are wound in alternating directions, the EMF and current generated in adjacent loops 191 have alternating polarities, as indicated by the "+" and "−" symbols in FIG. 5.

Each of the loops 191 encloses substantially the same area. Therefore, if the number of "+" loops 191a equals the number of "−" loops 191b and the loops 191 receive a uniform magnetic flux, the magnetic field induces a net zero EMF across the terminals 185 and 187 of the first receiver winding 178. This is also true for the second receiver winding 179.

If a disrupter 170 on the scale 104, or any other conductive object, is moved close to the read head 164, the magnetic field generated by the transmitter winding 180 will induce eddy currents in the disrupter 170 or the other conductive object. Consequently, a magnetic field is created in the vicinity of the disrupter counteracting the magnetic field generated by the transmitter winding 180. The eddy currents thus generate reverse magnetic fields that attenuate the transmitter magnetic field proximate to the disrupter 170.

As a result, the first receiver winding 178 receives a spatially altered or disrupted magnetic flux. So long as the "+" loops 191a and the "−" loops 191b are not equally disrupted, the receiver winding 178 outputs a non-zero EMF signal. Consequently, the EMF between the output terminals 185 and 187 will change polarity as the conductive disrupter 170 moves from adjacent to a "+" loop 191a to adjacent to a "−" loop 191b.

The size of the disrupter 170 preferably does not equal the wavelength 193. For example, assume the length 302 of the disrupter 170 is equal to the wavelength 193 and the width of the disrupter 170 is equal to the width 195. Then, regardless of where the disrupter 170 is positioned along the measuring axis 300 relative to the loops 191, it will disrupt the transmitter magnetic field over equal areas of adjacent "+" loops 191a and "−" loops 191b. As a result, the amplitude of the EMF signal output from the receiver winding 178 will be nominally zero.

Furthermore, the output from the receiver winding 178 will be insensitive to position of the object relative to the loops 191. That is, the output will be zero regardless of the disrupter's 170 position along the measuring axis. Since no useful signal results from this geometry, the size of the disrupter 170 preferably does not equal the wavelength 193. The length 302 of the disrupter 170 could be greater than one wavelength 193. However, because the portion of the disrupter equal to a full wavelength 193 will not contribute to the useful signal strength, the length 302 of the disrupter 170 is preferably less than one wavelength 193.

If the length 302 of the disrupter 170 is not equal to one wavelength 193 (or integer multiples of the wavelength 193), then in most positions, unequal "+" and "−" areas of the loops 191 will be disrupted. The signal output will thus be sensitive to the position of the disrupter 170 relative to the loops 191. The signal output will have a large amplitude change as a function of position when the length 302 of the disrupter 170 is equal to one-half of the wavelength 193. When the length of the disrupter 170 is one-half of a wavelength 193, the disrupter 170 will periodically cover either an entire "+" loop 191a or an entire "−" loop 191b, but will not cover any portion of an adjacent "−" loop 191b or "+" loop 191a. Thus, a one-half wavelength-long disrupter 170 will produce the strongest possible signal.

As shown in FIG. 4, the disrupters 170 are arranged on the scale 104 with a pitch (a distance of one edge to the adjacent corresponding edge) of one wavelength 193. Thus, successive disrupters are separated by one-half of a wavelength 193. The disrupters 170 are preferably highly electrically conductive, but not ferromagnetic. Thus, the disrupters 170 do not become magnetized and attract ferromagnetic particles. As shown in FIG. 1, in the first preferred embodiment, the length of the scale 104 exceeds the length of the read head 164. Thus, the length of the scale 104 establishes the measurement range for the linear scale 100.

Figure 6:
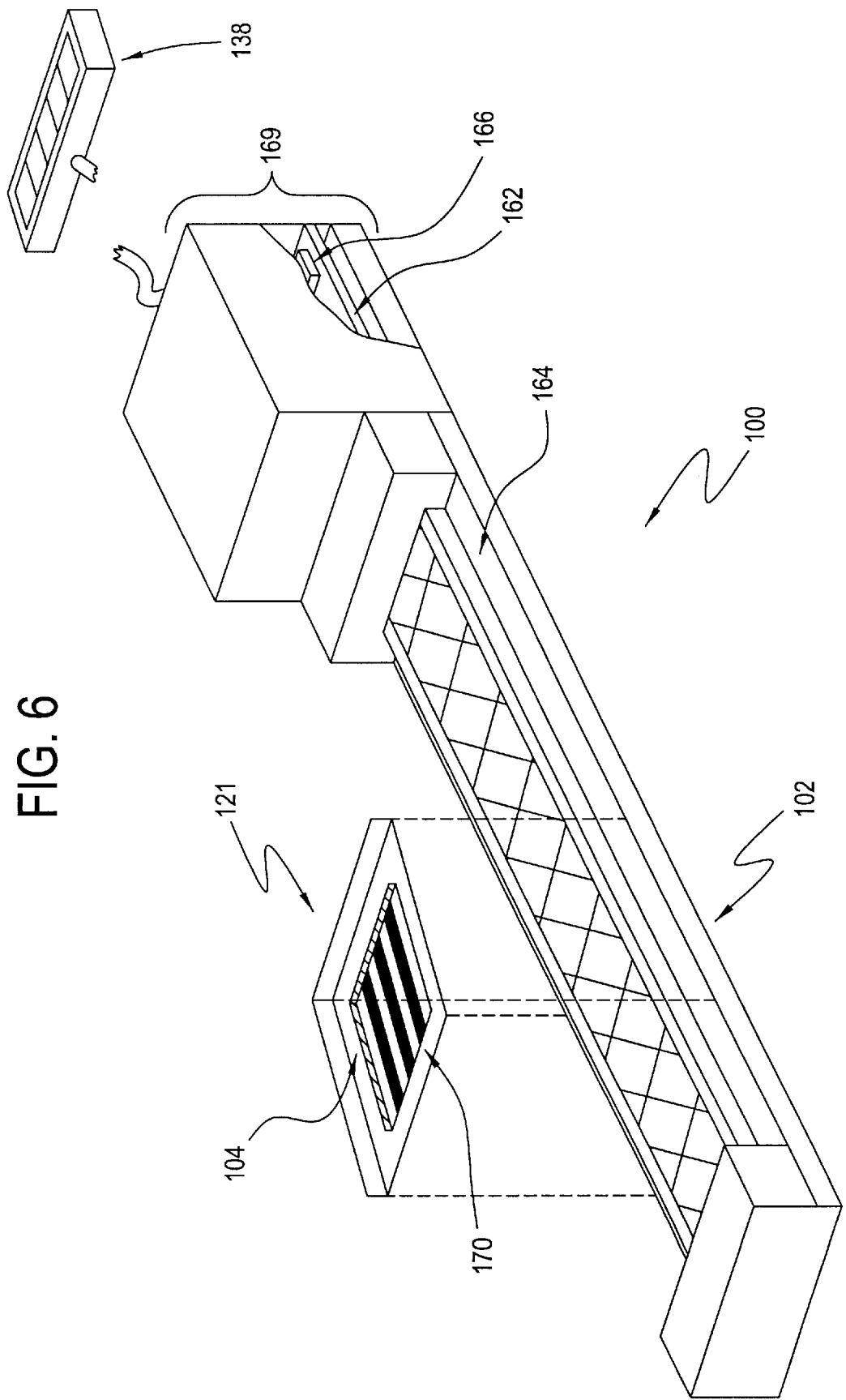
FIG. 6 is an exploded isometric view of a second preferred embodiment of the invention having receiver and transmitter windings on the carrier beam.

FIG. 6 shows a second preferred embodiment where the positions of the read head 164 and modulators 170 are reversed. The receiver windings 178 and 179 (represented as cross-hatch on the read head 164) and the transmitter winding 180 (not shown) are carried by the carrier beam 102. The disrupters 170 are part of a simplified slider assembly 121. Note that the slider assembly 121 is rotated from its normal perspective for illustration purposes so that the disrupters 170 can be seen. In this second embodiment, the read head 164 and the windings extend substantially the length of the carrier beam 102. In addition, a signal processing unit 169 is electronically connected to the read head 164 on the carrier beam 102 and a remote digital display 138. The signal processing unit 169 includes the signal processing electronics 166 mounted on the substrate 162. In this second preferred embodiment, the read head windings, not the modulators, effectively provide the long range position reference. In some applications, this reversed configuration may provide more convenient or compact installations. However, in most cases, the extended active windings should be avoided due to the negative effects associated with unshielded external electrical and magnetic fields.

In either the first or second preferred embodiments of the linear scale 100, the loops 191 of the first receiver winding 178 are preferably placed within a prescribed region in the interior of the transmitter winding 180. The inventors have experimentally determined that the transmitter winding 180 produces a magnetic field having an intensity that rapidly diminishes as a function of the distance from the conductor of the transmitter winding 180. However, the inventors have also experimentally determined that in the interior region of transmitter winding 180, the magnetic field tends to approach a uniform value beyond a certain distance from the conductor of the transmitter winding 180.

The certain distance thus defines the perimeter of a region of relatively uniform magnetic field. The distance at which the magnetic field becomes uniform is a function of the geometry of the winding. Consequently, to improve the accuracy of the inductive transducer of this invention, the loops 191 and 192 are preferably spaced the certain distance away from the transmitter winding 180. The loops 191 and 192 of the first and second receiver windings 178 and 179 are more preferably located entirely within the region of relatively uniform magnetic field.

In one exemplary embodiment, the disrupters 170, the receiver windings 178 and 179, and the transmitter winding 180 are dimensioned as follows:

Receiver winding wavelength=0.200 inch;
Disrupter length=0.100 inch;
Disrupter width=0.490 inch;
Transmitter winding width=0.400 inch;
Receiver winding width=0.340 inch;
One-quarter receiver wavelength=0.050 inch; and
Transmitter winding length=1.950 inches.

By accurately balancing and alternately interleaving the "+" loops 191a and the "−" loops 191b, the first receiver winding 178 has a nominally zero output in the absence of the disrupters 170. At the same time, locating the alternating "+" loops 191a and "−" loops 191b immediately adjacent to each other provides for a continuous signal at each receiver winding output as the disrupter 170 is moved along the measuring axis 300. These design factors provide a high signal-to-noise ratio in the linear scale 100. Thus, these features enable high accuracy measurement.

The above-outlined geometry of the first preferred embodiment of the read head 164 and scale 104 ensure that the linear scale 100 is highly accurate. Additionally, the above-outlined geometry of the first preferred embodiment of the linear scale 100 largely eliminates effects from non-uniform transmitter fields along the width of the read head 164 perpendicular to the measuring axis 300. The above-outlined geometry also rejects externally applied magnetic fields as "common-mode error" due to the balanced "differential detection" of the inductive transducer of this invention. The degree of accuracy in the first preferred embodiment of the inductive transducer linear scale 100 depends largely on the care in the design and construction of the read head 164 and the scale 104.

Figure 7A:
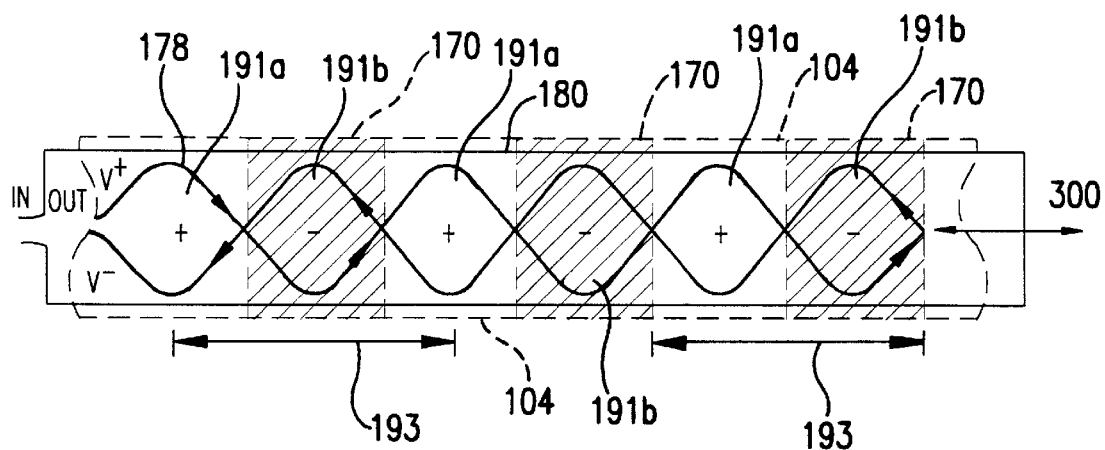
FIG. 7A is a plan view showing a receiver winding overlaying the scale, with the scale coupling to a first portion of the receiver winding.
Figure 7B:
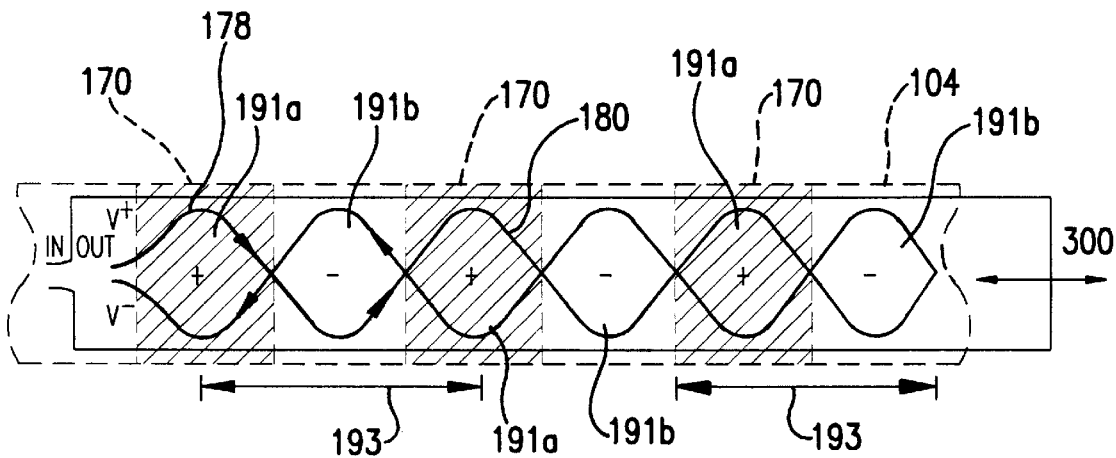
FIG. 7B is a plan view showing the receiver winding overlaying the scale, with the scale coupling to a second portion of the receiver winding.
Figure 7C:
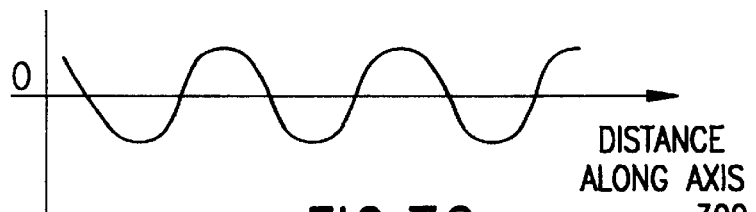
FIG. 7C is a waveform diagram showing the output signal amplitude and polarity, from the receiver winding as it moves versus position of the scale.

FIGS. 7A–7C show an example of the operation of the inductive linear scale 100. As the scale 104 and its disrupters 170 (shown in dashed lines) move relative to the transmitter 180 and the first receiver winding 178, the disrupters 170 cover either all of the "+" loops 191a and none of the "−" loops 191b, varying proportions of the "+" loops 191a and the "−" loops 191b, or all of the loops 191b and none of the "+" loops 191a.

FIG. 7A shows the disrupters 170 covering all of the "−" loops 191b and none of the "+" loops 191a of the first receiver winding 178. The transmitter winding 180 inductively couples to and induces eddy currents in the disrupters 170. As a result, the disrupters 170 produce magnetic fields that counteract the transmitter magnetic field passing through the "−" loops 191b. Thus, the net magnetic flux passing through the "−" loops 191b is less than the net magnetic flux passing through the "+" loops 191a. The "−" loops 191b therefore generate less induced EMF than the "+" loops 191a. Consequently, the first receiver winding 178 produces a net "positive" polarity current and voltage across its output terminals 185 and 187.

The output signal varies with time because the transmitter winding 180 generates a time-varying magnetic field. The amplitude and polarity of the time varying output signal relative to the input signal indicates the relative position between the read head 164 and the scale 104. FIG. 7C illustrates how the output signal amplitude and polarity vary as the position of the scale 104 varies relative to the read head 164.

The initial peak in the waveform shown in FIG. 7C is an example of a positive polarity amplitude output across the terminals 185 and 187 of the first receiver winding 178. Polarity indicates the time phase of the time-varying output signal relative to the input signal. The polarity of the output signal will be either in phase or inverted (180° out of phase) relative to the input signal.

FIG. 7B shows the scale 104 moved so that the disrupters 170 overlap all of the "+" loops 191a, but none of the "−" loops 191b. In this relative position, the induced current generated in the disrupters 170 counteracts the flux of the transmitter magnetic field passing through the "+" loops 191a. The "−" loops 191b thus generate more induced EMF than the "+" loops 191a. Consequently, the first receiver winding 178 generates a net negative polarity current and voltage at its output terminals 185 and 187. The initial valley in the waveform shown in FIG. 7C is an example of a negative polarity amplitude output across the terminals 185 and 187 of the first receiver winding 178.

When the disrupters 170 completely overlap the "−" loops 191b, as shown in FIG. 7A, the resulting output signal has a maximum positive amplitude, as shown in the peaks in the waveform of FIG. 7C. Conversely, when the disrupters completely overlap the "+" loops 191a, as shown in FIG. 7B, the resulting output signal has a maximum negative amplitude, as shown in the valleys in the waveform of FIG. 7C.

As the disrupters 170 move along the measuring axis 300 between the position shown in FIG. 7A and the position shown in FIG. 7B, the amplitude of the waveform of FIG. 7C varies continuously. In particular, the amplitude of the waveform of FIG. 7C is zero when the disrupters 170 overlap exactly one-half of each of the "+" loops 191a and the "−" loops 191b. From this position, as the disrupters 170 move more closely to the position shown in FIGS. 7A or 7B, the amplitude of the receiver output signal is increasingly positive or negative, respectively.

The first preferred embodiment of the read head 164, as shown in FIG. 4, has two receiver windings 178 and 179 spaced one-quarter of the scale wavelength 193 apart from each other. That is, the second receiver winding 179 overlaps the first receiver winding 178 and is offset by one-quarter of the scale wavelength 193. Thus, each "+" loop 192a of the second receiving winding 179 overlaps a portion of a "+" loop 191a and a portion of a "−" loop 191b of the first receiver winding 178. Similarly, each "−" loop 192b of the second receiver winding 179 overlaps a portion of a "+" loop 191a and a portion of a "−" loop 191b of the first receiver winding 178.

Insulation or crossover vias are suitably placed on or in the substrate 164, respectively, to electrically isolate the first receiver winding 178 from the second receiver winding 179. By spacing the first and second receiver windings 178 and 179 one-quarter of a scale wavelength 193 apart, the signals from the first and second receiver windings 178 and 179 are spatially in quadrature. That is, the signal amplitudes output from the receiver windings 178 and 179 define sinusoidal patterns as functions of position. In particular, the sinusoidal pattern of the second receiver winding 179 is spatially shifted 90° with respect to the sinusoidal pattern of the first receiver winding 178. As a result, the signal processing and display electronic circuit 166 detects the transitions between the signals from each of the receiver windings 178 and 179. By analyzing this relationship, the signal processing and display electronic circuit 166 determines the direction the read head 164 is moving relative to the scale 104. As outlined above, the amplitudes of the signals output by the windings 178 and 179 vary sinusoidally based on the position of the read head 164 relative to the scale 104. Thus, the signal processing and display electronic circuit 166 determines the position of the read head 164 with respect to the scale 104 by the following equation:

$$p = \frac{\tan^{-1}(S_1/S_2)}{2\pi}\lambda + n\lambda \qquad (1)$$

where:
- p is the position;
- $\lambda$ is the scale wavelength 193;
- n is an integer indicating the number of full wavelengths 193 traveled;
- S1 and S2 indicate the amplitudes and signs of the output signals received from the receiver windings 178 and 179, respectively; and
- "$\tan^{-1}$" is the inverse tangent function defining an angle between zero and $2\pi$ as a function of the ratio between S1 and S2. The signs of S1 and S2 define which quadrant the angle lies in according to Table 1.

TABLE 1

| S1 | S2 | $\tan^{-1}$ (S1/S2) |
|----|----|---------------------|
| +  | +  | 0 to $\pi/2$        |
| +  | −  | $\pi/2$ to $\pi$    |
| −  | −  | $\pi$ to $3\pi/2$   |
| −  | +  | $3\pi/2$ to $2\pi$  |

To improve the accuracy of the linear scale 100, and/or to reduce the demands on the analog signal processing circuitry for the receiver output signal, the read head 164 can include three or more overlapping receiver windings. While a read head 164 having three or more overlapping receiver windings is more difficult to manufacture, it provides, in combination with certain signal processing techniques, more accurate position readings than a read head 164 having only two overlapping receiver windings. Such multiple winding read heads are preferably equally phase-shifted. For example, for a number of windings m, the phase shift will be 180°/m.

Figure 8:
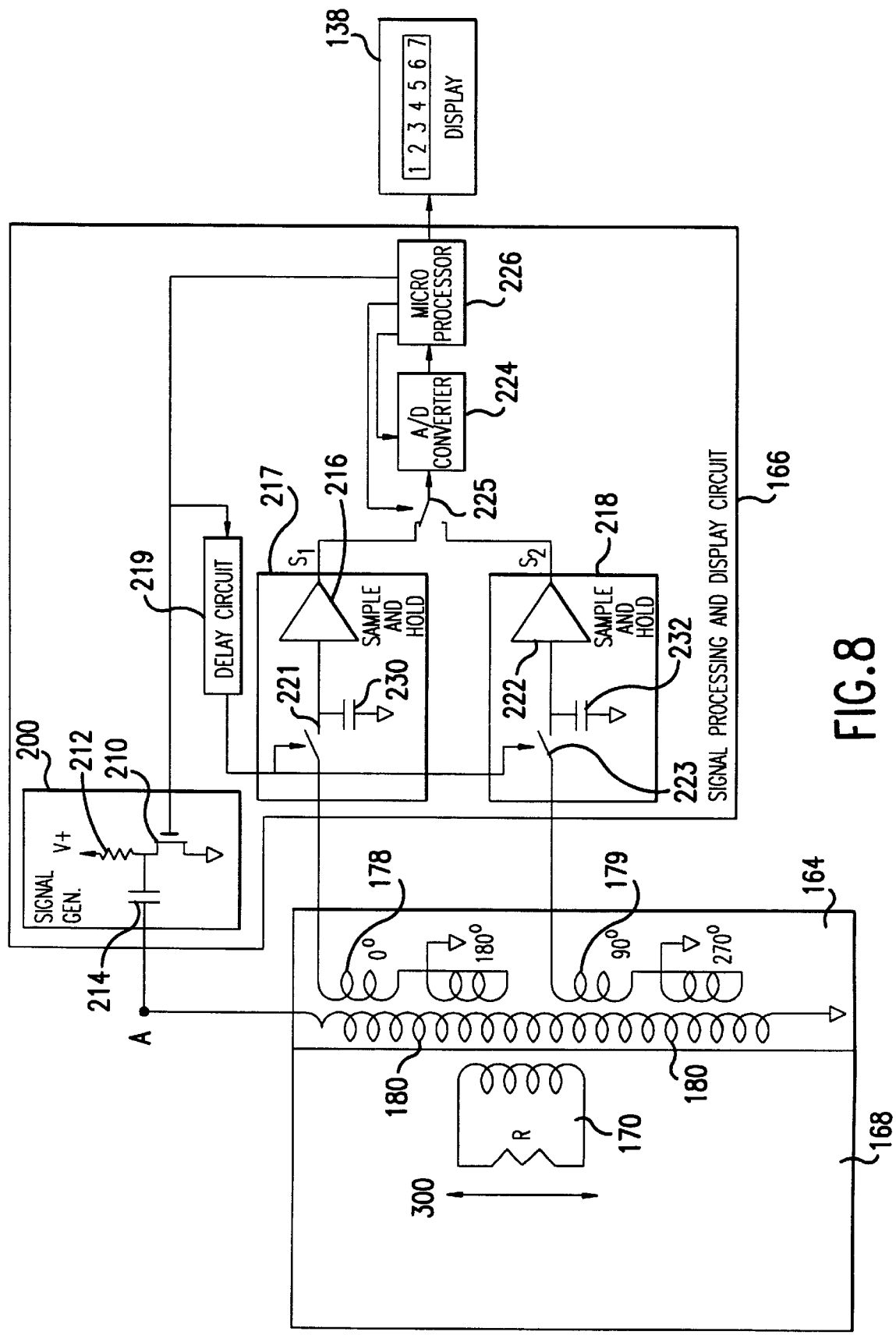
FIG. 8 is a block diagram of the encoder electronics used in the first and second embodiments of the electronic linear scale.

FIG. 8 shows the signal processing and display electronic circuit 166 in greater detail. The signal processing and display electronic circuit 166 solves Eq. 1 and controls the electronic operation of the linear scale 100. As shown in FIGS. 1 and 2, the signal processing and display electronic circuit 166 is mounted on the substrate 162 as a part of the slider assembly 120. Also shown in FIG. 2 is the digital display unit 139, which includes the switches 134 and 136 and a conventional digital display 138. To initialize a position measurement, the signal processing electronics 166 supply an electrical excitation signal to the transmitter winding 180 of the read head 164 (see FIG. 8).

As shown in FIG. 8, the signal processing and display electronic circuit 166 uses a programmed microprocessor or microcontroller and peripheral integrated circuit elements. However, the signal processing and display electronic circuit 166 can also be implemented on an ASIC or other integrated circuit, a hardwired electronic or logic circuit such as a discrete element circuit, a programmable logic device such as a PLD, PLA or PAL, or the like. In general, any device that supports a finite state machine capable of implementing the signal processing and display functions described herein can be used to implement the signal processing and display electronic circuit 166.

The signal processing and display circuit 166 preferably comprises a microprocessor 226. The microprocessor 226 inputs a signal from an A/D converter 224. The microprocessor 226 generates and outputs control signals to the display 138, the A/D converter 224, a switch 225, a signal generator 200, and a delay circuit 219. The output of the delay circuit 219 is input to the control inputs of a first sample and hold circuit 217 and a second sample and hold circuit 218.

Each of the outputs of first and second sample and hold circuits 217 and 218 are connected to one of the input terminals of the switch 225. The output of the switch 225 is connected to the input of the A/D converter 224. The inputs to the first and second sample and hold circuits 217 and 218 are connected, respectively, to the output terminals 185 and 188 of the first and second receiver windings 178 and 179.

The other output terminals 187 and 186, respectively, of the first and second receiver windings 178 and 179 are connected to ground. The output of the signal generator 200 is connected to the terminal 197 of the transmitter winding 180. The other terminal 198 of the transmitter winding 180 is also connected to ground.

To perform a position measurement, the signal processing and display electronic circuit 166 supplies an electrical excitation signal to the transmitter winding 180 of the read head 164.

As shown in FIG. 8, the first sample and hold circuit 217 has a buffer amplifier 216 connected to one of the terminals of the switch 225. The output terminal 185 of the first receiver winding 178 is connected through a switch 221 to the input of the buffer amplifier 216. The control terminal of the switch 221 is connected to the delay circuit 219 and inputs the sample and hold control signal. A capacitor 230 is connected between ground and the input terminal of the buffer amplifier 216.

The buffer amplifier 222, the switch 223, and the capacitor 232 of the second sample and hold circuit 218 are correspondingly connected between the delay circuit 219, the other terminal of the switch 225, the output terminal 188 of the second receiver winding 179 and ground.

As shown in FIG. 8, the microprocessor 226 is connected to the gate of a transistor 210 of the signal generator 200. A supply voltage V+ is connected through a bias resistor 212 to the drain of the transistor 210. The source of the transistor 210 is connected to ground.

An LC series circuit is formed by a capacitor 214 and the transmitter winding 180. The LC series circuit is connected between the drain of the transistor 210 and ground. When the transistor 210 is off, the capacitor 214 is connected through the resistor 212 to the supply voltage V+ and is charged to the supply voltage V+. The supply voltage is preferably supplied by an appropriate power source (not shown), such as a battery. Together, the power supply V+, the transistor 210, the resistor 212 and the capacitor 214 form the first preferred embodiment of the signal generator circuit 200 of the signal processing and display electronic circuit 166.

To turn on the transistor 210, the microprocessor 226 supplies a short pulse to the gate of transistor 210. When the transistor 210 is on, the capacitor 214 is connected to ground through the transistor 210. Because the capacitor voltage cannot change instantly, the voltage at the node A between the capacitor 214 and the transmitter winding 180 is driven to a negative value.

Then, the capacitor 214 and the transmitter winding 180 resonate with each other at a frequency determined by the capacitance of the capacitor 214 and the inductance of the transmitter winding 180.

During each sampling period of the receiver output signal, the capacitor 214 is discharged and then recharged. For the low power induced current transducer used in the first and second preferred embodiments of the linear scale 100, a sampling frequency of about 1 kHz is preferred. The capacitor 214 preferably has a value of 1 nF and the power supply voltage V+ is preferably 3 V.

The charge (in coulombs) provided by the power supply voltage V+ is equal to the capacitance of the capacitor times the change in voltage across the capacitor (coulomb= farad*volt). Accordingly, the charge stored by the capacitor 214 is equal to the capacitance of the capacitor 214, 1 nF, times the voltage across the capacitor, 3 V, or 3 nC.

The capacitor will discharge and recharge every sampling period, which is 1ms for a sampling rate of 1 kHz.

Additionally, current is charge divided by time (amp= charge/second). Accordingly, the average current drawn from the power supply during one sampling interval is 3 nC/1 ms=3 $\mu$A. Three microamps is a very small current, even for a battery-powered transducer.

In practice, the sampling frequency is preferably sufficiently high so that the transducer does not move more than ¼ of the wavelength between measurements. For a wavelength of 0.2 inches (5.08 mm), a sampling rate of 1 kHz and maximum allowable error during motion of ¼ wavelength (1.27 mm) the maximum allowable speed is 1.27 m/s. To obtain higher speeds, or to reduce the maximum error at this speed, the sampling rate can be increased. Alternatively, the analyzing circuit can include a conventional second-order position follower, rather than increasing the sampling rate.

Because of the chosen circuit configuration, the signal generator 200 enables the transducer to intermittently provide a strong output signal (about 60 mV maximum) across the terminals 185–188 of the receiver windings 178 and 179. However, because of the inventive circuit and transducer configuration, and because the driving signal is a short pulse and operates with a low duty cycle, this results in a very small average current, even at the desired rapid sampling rate of 1 kHz. A small average current is required for a battery or solar cell-powered electronic linear scale to be commercially practical.

To minimize power consumption, the input pulse applied to the transistor 210 should be as short as possible, so that the charge lost through the bias resistor 212 is minimized. In the example outlined above, if the pulse length is 1 $\mu$s and resistor 212 has a value of 10 k$\Omega$, the average current through the resistor 212 is only 0.3 $\mu$A. In general in this invention, the average current used to charge the capacitor 214 is preferably less than 75 $\mu$A, and more preferably less than 10 $\mu$A. As shown in FIG. 8, the capacitors 230 and 232 are electrically connected in parallel to the receiver windings 178 and 179, respectively. The capacitances of the capacitors 230 and 232 form resonant circuits with the inductances of the receiver windings 178 and 179. If the resonant frequency of these resonant circuits is the same as the resonant frequency of the transmitter resonant circuit, the strength of the signal output from the receiver windings is increased and unwanted noise is filtered from the signals.

Figure 9:
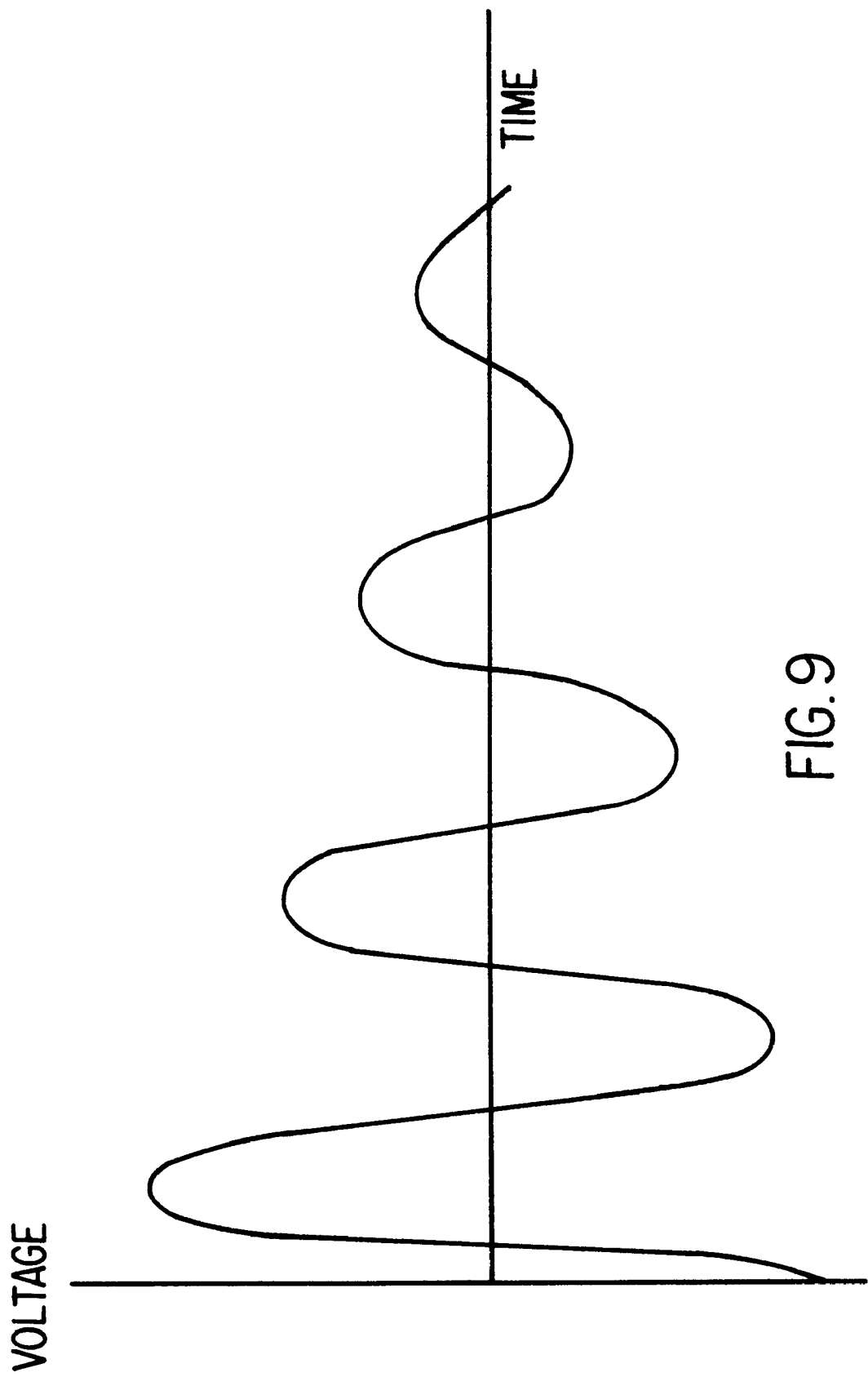
FIG. 9 shows a plot of voltage versus time for a resonant signal output from the signal generator.

Since the transmitter winding 180, as an inductor, and the capacitor 214 form a resonant LC circuit, a voltage transient measured at node A will have a decaying resonant behavior, as shown in FIG. 9. The transient voltage signal causes a corresponding current flow in the transmitter winding 180. This, in turn, produces a changing magnetic flux normal to the loops 191 and 192 of the receiver windings 178 and 179, respectively.

The receiver windings 178 and 179 each have two conductor portions. As shown in FIG. 8, these portions are placed at spatial phase positions corresponding to 0° and 180° for the first receiver winding 178, and at 90° and 270° for the second winding 179. As previously described, with the scale 104 and the disrupters 170 in place, a current is induced in the disrupters 170. The field from this induced current results in a net EMF in the receiver windings 178 and 179.

The degree notation in FIG. 8 (0°, 90°, 180°, 270°) corresponds to the location of the different parts of the windings 178 and 179 relative to a nominal position. The serial connection of the two halves of the first receiver winding 178, for example, causes the voltage at the output of the first receiver winding 178 to have one polarity when the disrupters 170 are in the 0° position. The voltage at the output of the first receiver winding 178 has the opposite polarity when the disrupters 170 are in the 180° position.

The signals from the receiver windings 178 and 179 are transmitted to the signal processing and display electronic circuit 166. The signal processing and display electronic circuit 166 analyzes the signals to determine the distance being measured by the linear scale 100. The signal processing and display electronic circuit 166 then is connected to, and provides a drive signal to, the display 138 through a conventional connection to provide a digital readout of the measured distance.

Figure 10C:
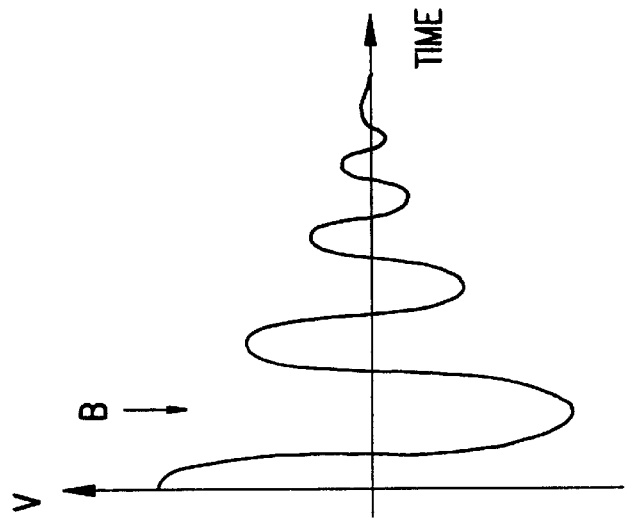
FIG. 10C is a plot of voltage versus time when the relative position between the flux modulator and the receiver winding has been moved one-half wavelength.
Figure 10B:
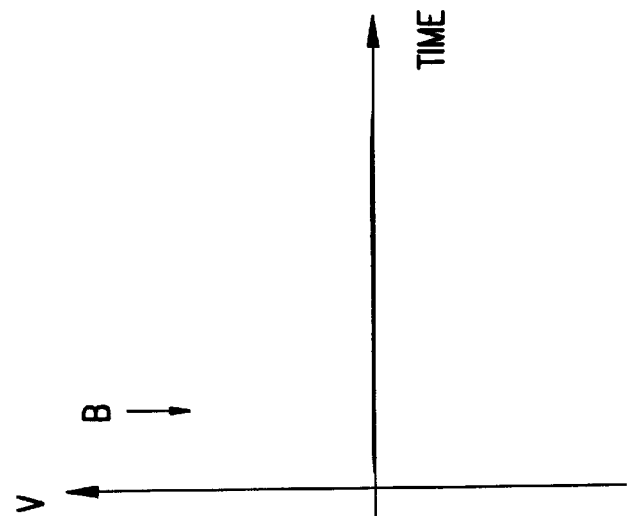
FIG. 10B is a plot of voltage versus time when the relative position between the scale and the main beam has been moved one-quarter wavelength.
Figure 10A:
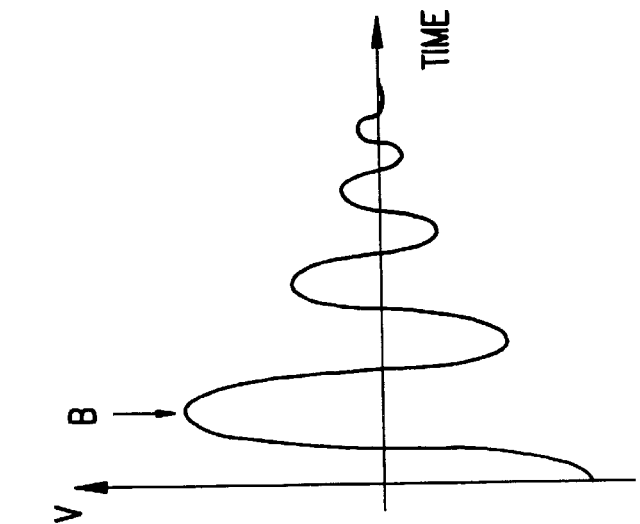
FIG. 10A is a plot of voltage versus time for a signal output from the receiver winding.

FIGS. 10A–10C show the voltage induced across the output of the first receiver winding 178 in response to the transmitter winding's transient voltage excitation, as shown in FIG. 9. In particular, FIGS. 10A–10C show the induced voltage for three different positions of the disrupters 170 relative to the loops 191 of the first receiver winding 178. The amplitude and phase of the receiver signal depend on the position of the scale 104 relative to the receiver winding 178 or 179.

The receiver signal shown in FIG. 10A has a peak amplitude at point B. The peak amplitude indicates that the relative position between the scale and the receiver winding 178 or 179 is such that a maximum amplitude signal results. The inventors have experimentally determined that if the inductance of the transmitter winding 180 is 0.5 $\mu$H, the capacitance of the capacitor 214 is 1 nF, the gap 174 is approximately 0.5 mm, and the power supply voltage V+ is 3 V, then the maximum receiver output signal at point B will be approximately 60 mV. The LC series circuit formed by the capacitor 214 and the transmitter winding has a resonant frequency of approximately 7 MHz.

FIG. 10B shows the receiver signal when the scale 104 is moved ¼ of the wavelength 193 from the relative position generating the receiver signal shown in FIG. 10A. As shown in FIG. 10B, this relative position between the first receiver winding 178 and the disrupters 170 generates a receiver output signal having an amplitude of zero at point B. This signal corresponds to a position where each disrupter 170 overlaps equal areas of adjacent "+" loops 191a and "−" loops 191b for the receiver winding 178.

In FIG. 10C, the scale has been moved another ¼ of the wavelength 193 in the same direction, for a total displacement of ½ of a wavelength 193 from the relative position generating the receiver signal shown in FIG. 10A. In this relative position, the disrupter 170 overlaps a loop 191 of opposite polarity from the loop 191 corresponding to FIG. 10A. Accordingly the first receiver winding 178 produces a maximum negative amplitude receiver signal at point B.

FIGS. 11A–G show the signals present at various points of the signal processing and display electronic circuit 166. As shown in FIGS. 11D and 11E, the disrupters 170 are positioned relative to the loops 191 and 192 such that the receiver signals output by the receiver windings 178 and 179 are equal and opposite. The equal and opposite receiver signals output by the receiver windings 178 and 179 are input to the sample and hold circuits 217 and 218, respectively, of the signal processing and display electronic circuit 166.

FIG. 11A shows the transmission control signal output by the microprocessor 226 to the gate of the transistor 210. As shown in FIG. 11A, the transmission control signal has a duration of t. FIG. 11B shows the resulting oscillating transmitter signal applied to the transmitter winding 180.

FIG. 11C shows the sample and hold control signal output from the delay circuit 219. The delay circuit 219 inputs the transmission control signal shown in FIG. 11A from the microprocessor 226 to simultaneously initiate the sample and hold control signal. The duration of the sample and hold signal is chosen according to circuit and transducer design parameters, either by analysis or experiment. In particular, the duration is chosen such that the trailing edge of the sample and hold control signal coincides as closely as possible in time with the amplitudes of the receiver signals reaching point B, as shown in FIGS. 10A and 10C. In response to the sample and hold control signal output from the delay circuit 219, the first and second sample and hold circuits 217 and 218 sample the signals from the first and second receiver windings 178 and 179, respectively.

The sample and hold control signal closes the switches 221 and 223 generally simultaneously with the start of the transmission signal being applied to the transmission winding 180. The signals output by the first and second receiver windings 178 and 179 appear on the capacitors 230 and 232, respectively, as shown in FIGS. 11F and 11G.

At a time nominally chosen to coincide with time B, the sample and hold control signal returns to zero and the switches 221 and 223 open. The voltages across the capacitors 230 and 232 at that instant are then held. In general, the sampled voltage may be held at any time during the receiver signals shown in FIGS. 11D and 11E, except at the zero crossings. The time B is the preferred hold time and occurs when the maximum receiver signal strength is obtained.

As illustrated in FIGS. 11B and 11C, this corresponds to a peak of the resonant response. The time B is established by the delay circuit 219, which is, for example, a monostable flip-flop triggered by the transmission control signal.

The sampled voltages are input to the high input impedance buffer amplifiers 216 and 222. The buffer amplifiers 216 and 222 provide gain and isolate the capacitors 221 and 223 to prevent the capacitors 221 and 223 from losing their charge. The buffer amplifiers 216 and 222, respectively, output a signal $S_1$, corresponding to the receiver signal output by the receiver winding 178, and a signal $S_2$, corresponding to the receiver signal output by the receiver winding 179. The selector switch 225 alternately couples the outputs of the buffer amplifier 216 or 222 to the A/D converter 224. The A/D converter 224 converts the analog signals $S_1$ and $S_2$ to digital signals.

The microprocessor 226 inputs the digital signal from the A/D converter 224, computes a measurement position, and outputs appropriate signals to the display 138. The microprocessor 226 can evaluate the position of the scale 104 in any one of a variety of methods, including the method defined by Equation (1).

The display button logic, the system control logic, analysis of displacements exceeding one wavelength, and other typical electronic scale functions are preferably provided as in the prior art capacitive electronic linear scales, such as those produced by Mitutoyo, Brown & Sharp, Sylvac, Starret, etc. The preferred embodiment displays the measured distance on the display 138. The computed measurement position can also be output to other systems through suitable connections (not shown) similar to those in commercially available capacitive linear scales. For example, the computed measurement data may be output to a statistical process control system or to a remote measurement display.

The signal processing and display electronic circuit 166 can be readily incorporated into the linear scale 100 by mounting the elements of the signal processing and display electronic circuit 166 on the substrate 162. In some cases, a conventional multi-layer printed circuit substrate can be used, so that the internal layers of the substrate can be used to provide conventional ground-plane shielding (not shown) between noise-generating and sensitive parts of the signal processing and display electronic circuit 166. This eliminates unwanted interaction between the electronic signals in these elements.

As shown in FIGS. 11A–G, the transmission control signal remains high for several peaks of the resonant response. However, as shown in FIGS. 12A–G, the transistor 210 may be turned off after a sufficient period to allow sampling of the capacitor voltages. The transistor 210 does not need to remain on beyond the sampling time.

Thus, to conserve power, the transistor 210 can be turned off before the resonant circuit has dissipated its stored energy. Preferably, as shown in FIG. 12A, the transistor 210 is turned off at time C when the voltage across the capacitor 214 has returned as close as possible to its original value. In the preferred embodiment described above, the original value is the battery voltage V+.

It should also be appreciated that sufficient time must be provided between successive transmission control pulses, in order to allow the capacitor 214 to fully recharge. Generally, if the circuit comprising the capacitor 214 and the resistor 212 has a time constant $T_c$, the time allowed between successive transmission control pulses, i.e., the pulse interval of the drive signal, should be at least 4 times the time constant $T_c$.

Figure 13:
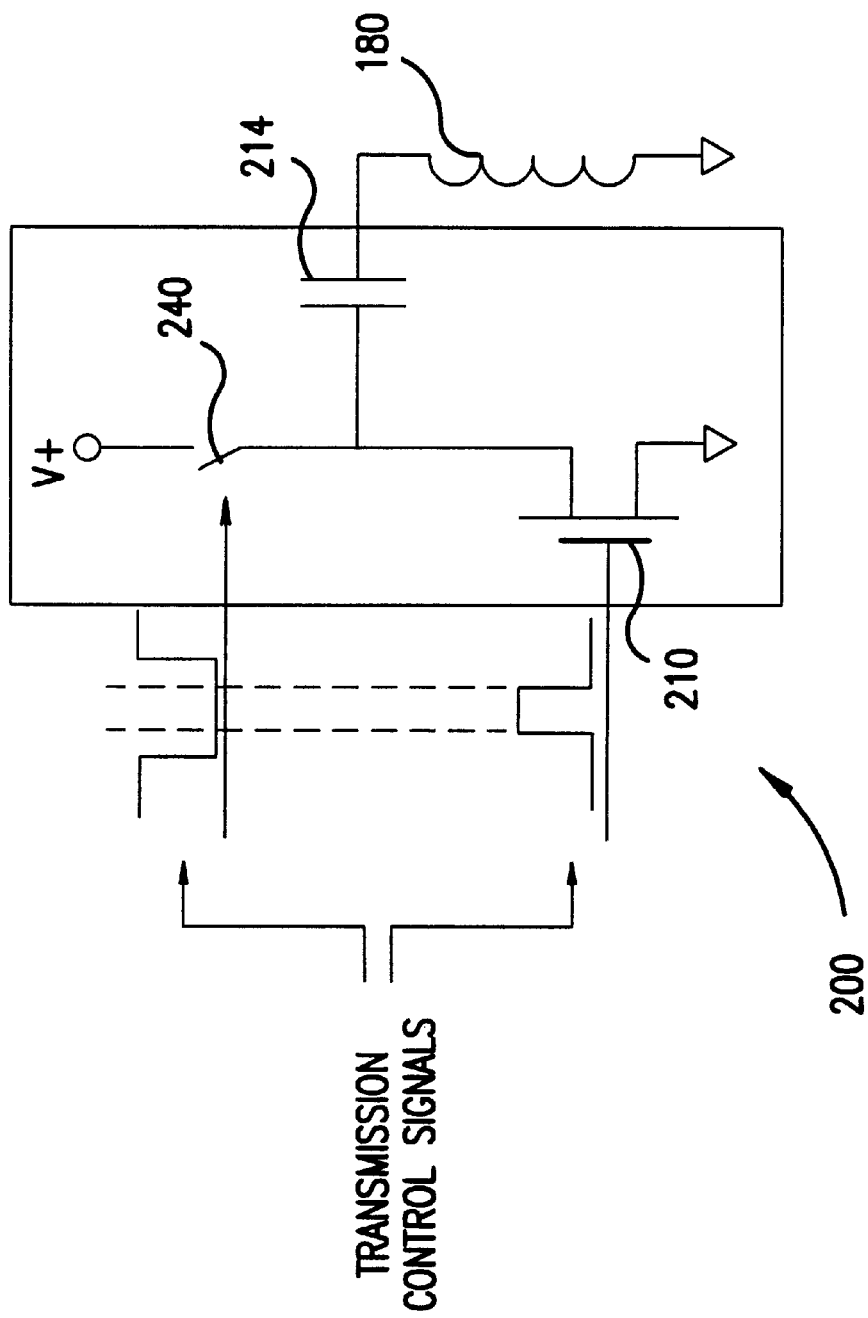
FIG. 13 is a circuit diagram of a second preferred embodiment of the signal generator.

A second preferred, and low-power, embodiment of the signal generator 200 is shown in FIG. 13. In the first preferred embodiment of the signal generator 200, energy is lost through the bias resistor 212 when the transistor 210 is turned on. The second preferred embodiment of the signal generator 200 eliminates a substantial portion of this energy loss by using an active pull up switch 240 in place of the bias resistor 212 to bias the transistor 210. This energy loss is minimized because the resistance of the pull up switch 240 when it is open, is much greater than the resistance of the bias resistor 212.

The active pull-up switch 240 also allows the capacitor 214 to be charged much faster. Thus, the low on-resistance of the switch 240 allows a much higher sampling rate compared to the first preferred embodiment of the signal generator shown in FIG. 8. In the second preferred embodiment of the signal generator 200, the switch 240 and the transistor 210 are controlled by a pair of synchronous control signals.

The microprocessor 226 generates the switch control signal input to the control switch 240 and the transistor 210. The switch control signal to the switch 240 is high when the transmission control signal to the transistor 210 is low. In this condition, the switch 240 is closed and the capacitor 214 is charged to V+ through the transmission winding 180. The transmission control signal to the transistor 210 is low, turning off the transistor 210.

This arrangement prevents the switch 240 and the transistor 210 from conducting at the same time. This prevents a large current draw from the battery and preserves battery life.

When the capacitor 214 is charged, the control switch signal opens the switch 240. Thereafter, the transmission control signal to the transistor 210 turns on the transistor 210. It should be appreciated that the transistor 210 remains off until after the switch 240 is off so the switch 240 and the transistor 210 do not conduct at the same time.

When the transistor 210 is turned on, the is capacitor 214 is connected to ground. The charged capacitor 214 and the transmitting winding 180 form a resonant circuit. Because the capacitor 214 is charged, the voltage across the transmitter winding 180 resonates as shown in FIG. 9.

The corresponding current through the transmitter winding also generates the changing magnetic field through the receiver windings 178 and 179. The disrupters 170 then induce a net signal in the receiver windings 178 and 179. The delay circuit 219 controls the sample and hold circuit in relation to the transmission signal to transistor 210, as previously described. The amplitude and sign of the net signal will depend upon the position of the disrupters 170 relative to receiver windings 178 and 179.

Figure 14:
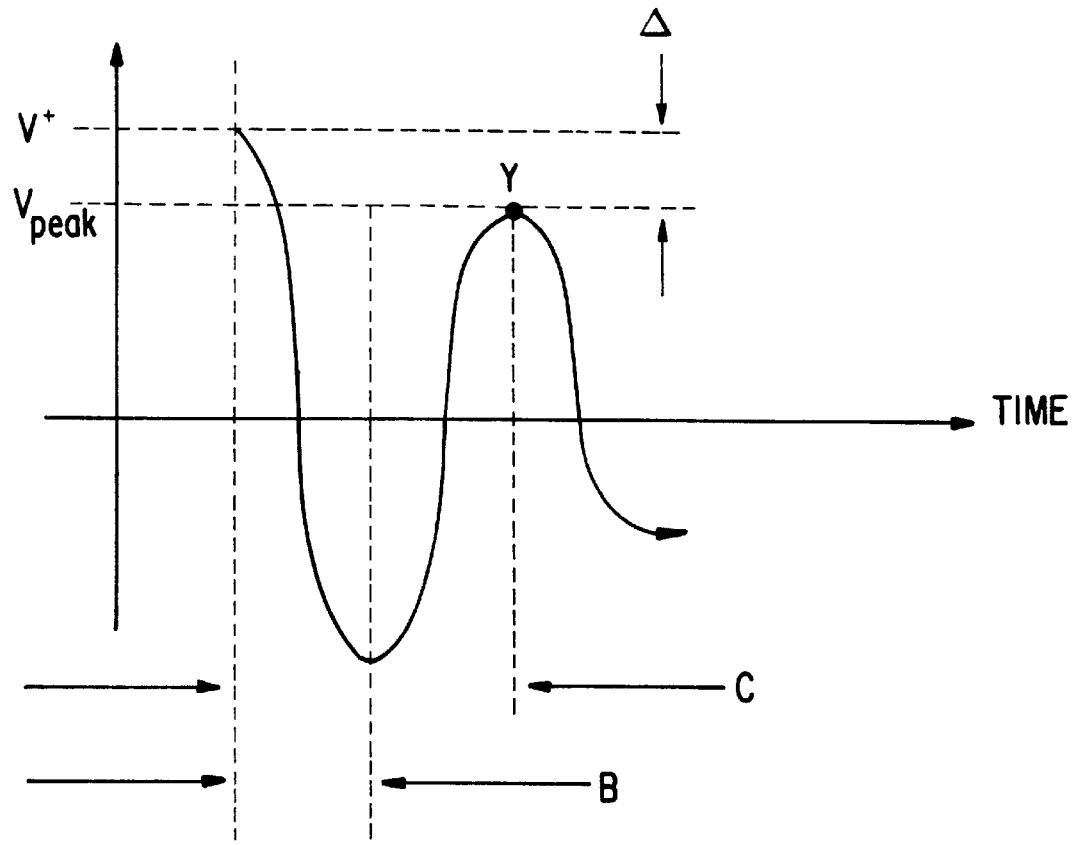
FIG. 14 is a plot of voltage versus time for a resulting signal across the capacitor in the signal generator of FIG. 13.

A high Q-value corresponds to low energy loss in the resonant circuit. A high Q-value is desirable because the voltage across the capacitor 214 swings back closer to the battery voltage V+. Thus, if the transmission control signal is turned off at time C, as shown in FIGS. 12A and 14, the voltage across the capacitor 214, $V_{peak}$, will be only slightly below the battery voltage V+. Thus, the battery needs to provide only a small amount of charge to replenish or recharge the capacitor 214 in preparation for the next transmission/reception cycle.

As shown in FIGS. 12F and 12G, turning the transmission control signal off at time C does not affect the sampled signals on the capacitors 230 and 232 because the transistor 210 remains on until after the sampling time B.

Figure 15:
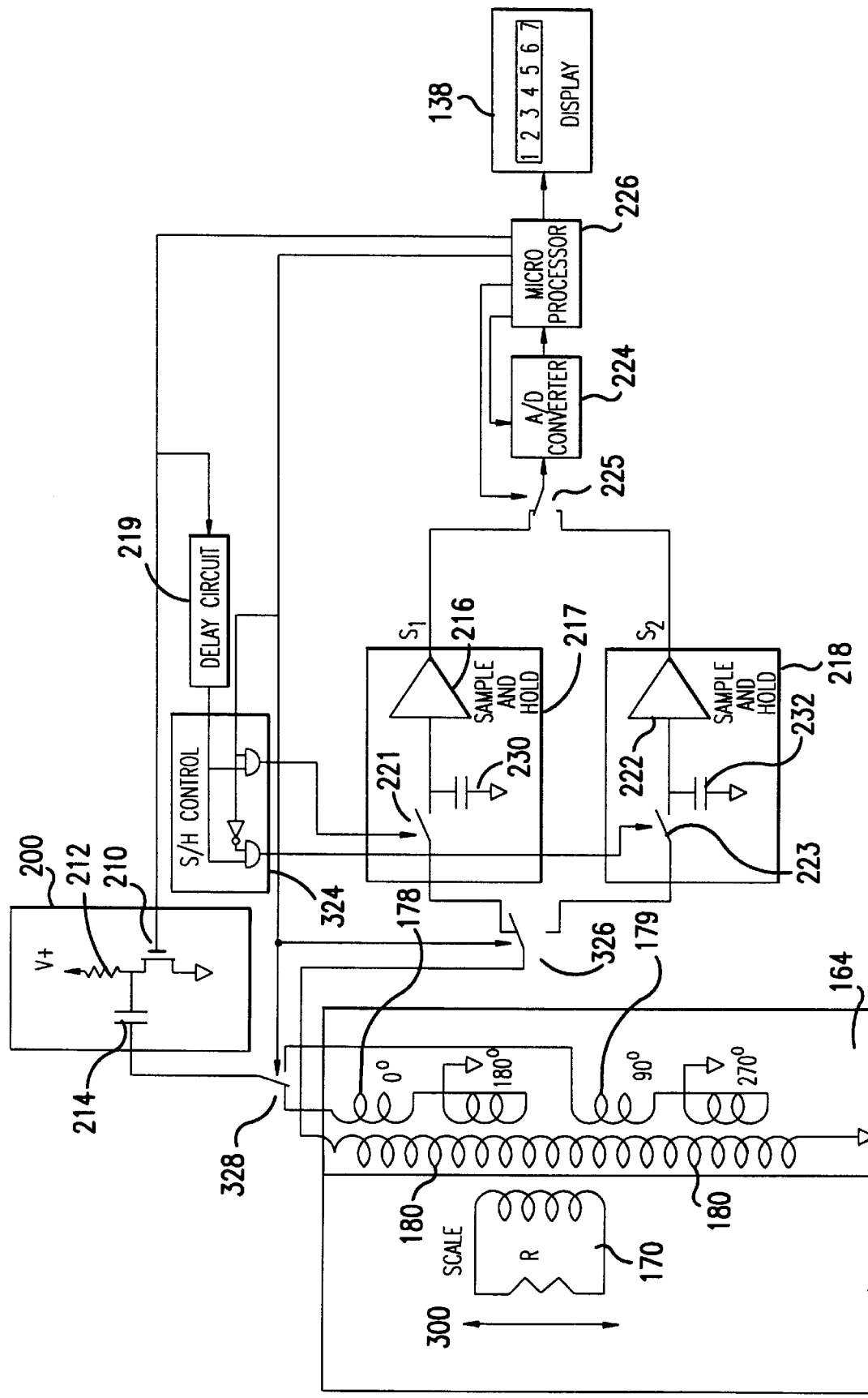
FIG. 15 is a block diagram of the encoder electronics of the electronic linear scale, operating in reverse compared to the encoder electronics of FIG. 8.
Figure 16:
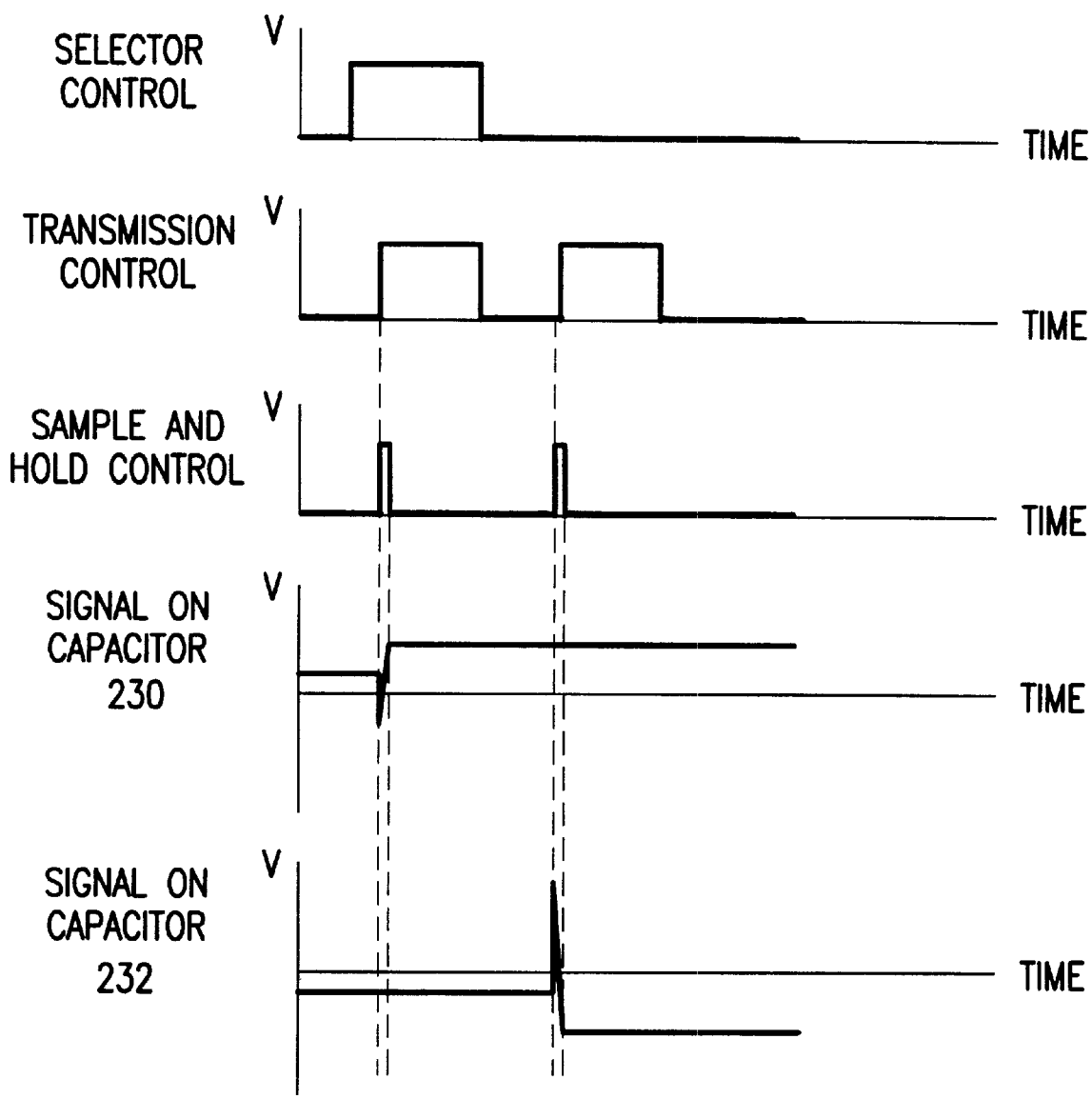
FIG. 16 is a signal timing diagram showing voltages at selected locations in the encoder electronics of FIG. 15 during sampling.

It is also possible to operate the linear scale transducer in reverse, i.e., to transmit through the windings 178 and 179 and receive, or sense magnetic flux, through winding 180. The encoder electronics for this mode of operation are shown in FIG. 15. FIG. 16 is a signal timing diagram showing the timing of the control signals.

As described below and shown in FIG. 16, it is possible to first transmit a signal from one of the windings 178 and 179, receive the transmitted signal through winding 180, and then transmit a second signal from the other one of the windings 178 and 179 to the winding 180, to obtain information necessary to determine the location of the transducer on the linear scale.

Although it is possible to have two signal generators (not shown), in practice it is difficult to manufacture generators that are sufficiently well matched because of variations in the discrete electrical components within the generators. Furthermore, although signals can be simultaneously broadcast from two transmitters (e.g. windings 178 and 179) and received through the winding 180, using such information to determine location of the of the transducer on the linear scale would require that the signal processing include phase analysis, which is beyond the scope of this application. Accordingly, the process described below refers to a signal generator 200 that causes a first signal to be transmitted from one of the windings 178 and 179, and then subsequently a second signal from the other one of the windings 178 and 179.

The microprocessor 226 controls three selector switches 324, 326, and 328 with the selector control signal. When the selector control signal goes high, the switches 326 and 328 are moved to the positions shown in FIG. 15. In these positions, the winding 178 is connected to the signal generator and the winding 180 is connected to the sample-and-hold circuit 217. The sample and hold control signal is also routed to sample-and-hold circuit 217. Next, the microprocessor 226 outputs a transmission control pulse to the signal generator 200 and to the delay circuit 219. The signal $S_1$ is thus sampled and held by the switch 221 and the capacitor 230.

The microprocessor 226 then changes the selector control signal to low. This moves switches 326 and 328 to their alternate positions. Thus, the winding 179 is connected to the signal generator 200 and the winding 180 is connected to the sample-and-hold circuit 218. The sample and hold control signal is also routed to the sample-and-hold circuit 218. The microprocessor 226 outputs a new transmission control signal to the signal generator 200 and to the delay circuit 219. The signal $S_2$ is thus sampled and held by the switch 223 and the capacitor 232. The rest of the signal processing is the same as described in conjunction with FIG. 8.

In the encoder electronics shown in FIG. 15, a single signal generator is used, and is alternately connected to the transmitter windings 178 and 179. It is also possible to use two signal generators, each connected to one of the transmitter windings 178 and 179.

Figure 17:
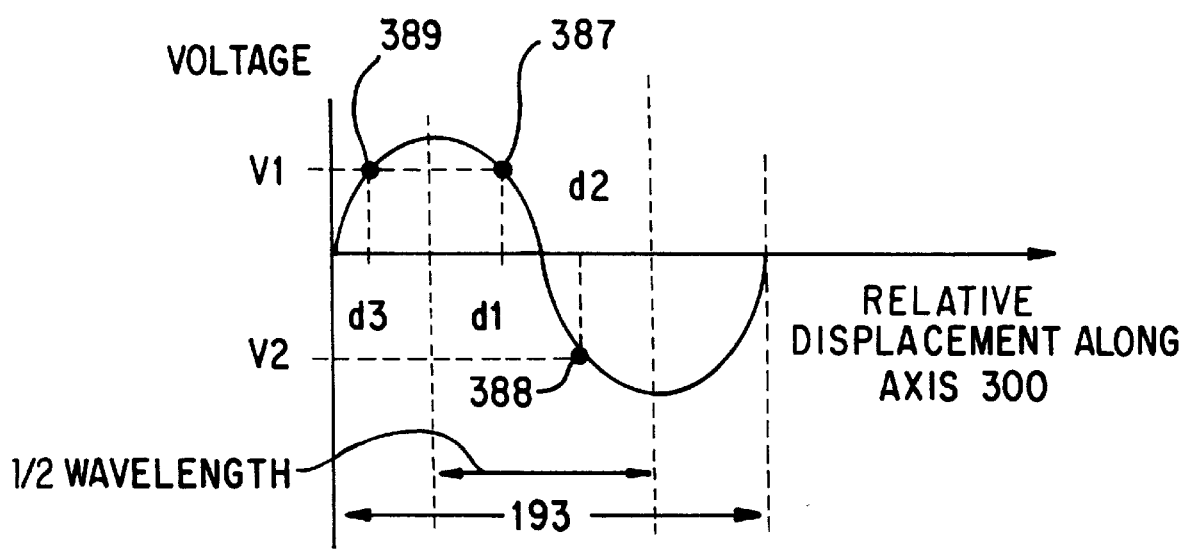
FIG. 17 is a waveform diagram showing a plot of the voltage amplitude out of the receiver winding versus the position of the scale.

The microprocessor 226 is able to determine an absolute position measurement within one-half of the wavelength 193, using known interpolation routines and only one receiver winding. For example, as shown in FIG. 17, the microprocessor 226 can distinguish between a first position d1 and a second position d2 within one-half of the wavelength 193 by comparing the amplitude and polarity of the receiver signal at points 387 and 388, respectively.

The point 387 has a voltage value of V1, while point 388 has a voltage value of V2. The position d3 corresponds to the point 389 in the receiver signal shown in FIG. 17. The point 389 has the same voltage value V1 as the point 387. Therefore, the microprocessor 226 cannot determine the difference in relative position between the first position d1 and the third position d3 using the interpolation approach.

In the preferred embodiments described above, the microprocessor 226 resolves such ambiguities by using the signal from the second receiver winding 179 according to well-known quadrature signal analysis techniques, as shown in Eq. 1. For motion beyond one wavelength, the microprocessor 226 detects and accumulates the number of wavelengths traversed from a known starting position, according to well-known techniques, to determine the relative positions of the read head 164 and the scale 104.

The microprocessor 226 supplies pulses at a sampling frequency of about 1 kHz to provide sufficient accuracy and motion tracking capability. To reduce power consumption, the microprocessor 226 also keeps the duty cycle low by making the pulses relatively short. For example, for the 1 kHz sampling frequency described above, typical pulse width is about 0.1–1.0 $\mu$s. That is, the duty cycle of the pulses having sampling period of 1 ms is 0.01%–0.1%.

The resonant frequency of the capacitor 214 and the winding 180 is then preferably selected such that the peak of the voltage across the capacitor 214 occurs before the end of the at most 1.0 $\mu$s pulse. Thus, the resonant frequency is on the order of several megahertz. The corresponding magnetic flux will therefore be modulated at a frequency above 1 MHz, and typically at a frequency of several megahertz. This is considerably higher than the frequencies of conventional inductive transducers.

The inventors have determined that, at these frequencies, the eddy currents generated in the disrupters 170 produce a strong disruptive effect on the magnetic flux. The output EMFs of the receiver windings 178 and 179 therefore respond strongly to variations in disrupter position. This occurs despite the low duty cycle and low power used by the pulse signal. The strength of the response, combined with the low duty cycle and low power consumption, allows the linear scale 100 to make measurements while the signal generator 200 and the remainder of the signal processing and display electronic circuit 166 draw an average current preferably below 200 μA, and more preferably below 75 μA. It should be understood that "average current" as used herein means the total charge consumed over one or more measurement cycles, divided by the duration of the one or more measurement cycles, while the caliper is in normal use.

The linear scale 100 can therefore be operated with an adequate battery lifetime using three or fewer commercially available miniature batteries or with a solar cell.

For an incremental-type transducer, the rate at which the transducer signals are sampled is about 1000 samples per second. The high sampling rate is required to keep track of the number of wavelengths traveled, when the slider assembly 120 is moving quickly. However, the microprocessor 226 only needs to update the display 138 with a new measurement value about 10 times per second. Therefore, the power consumption of the linear scale can be reduced further if the microprocessor 226 and A/D converter 224 can be relieved of the task of performing high resolution position measurements for a majority of the 1000 samples per second. This can be accomplished by keeping track of the number of scale wavelengths traveled without performing high resolution position measurements.

Figure 18:
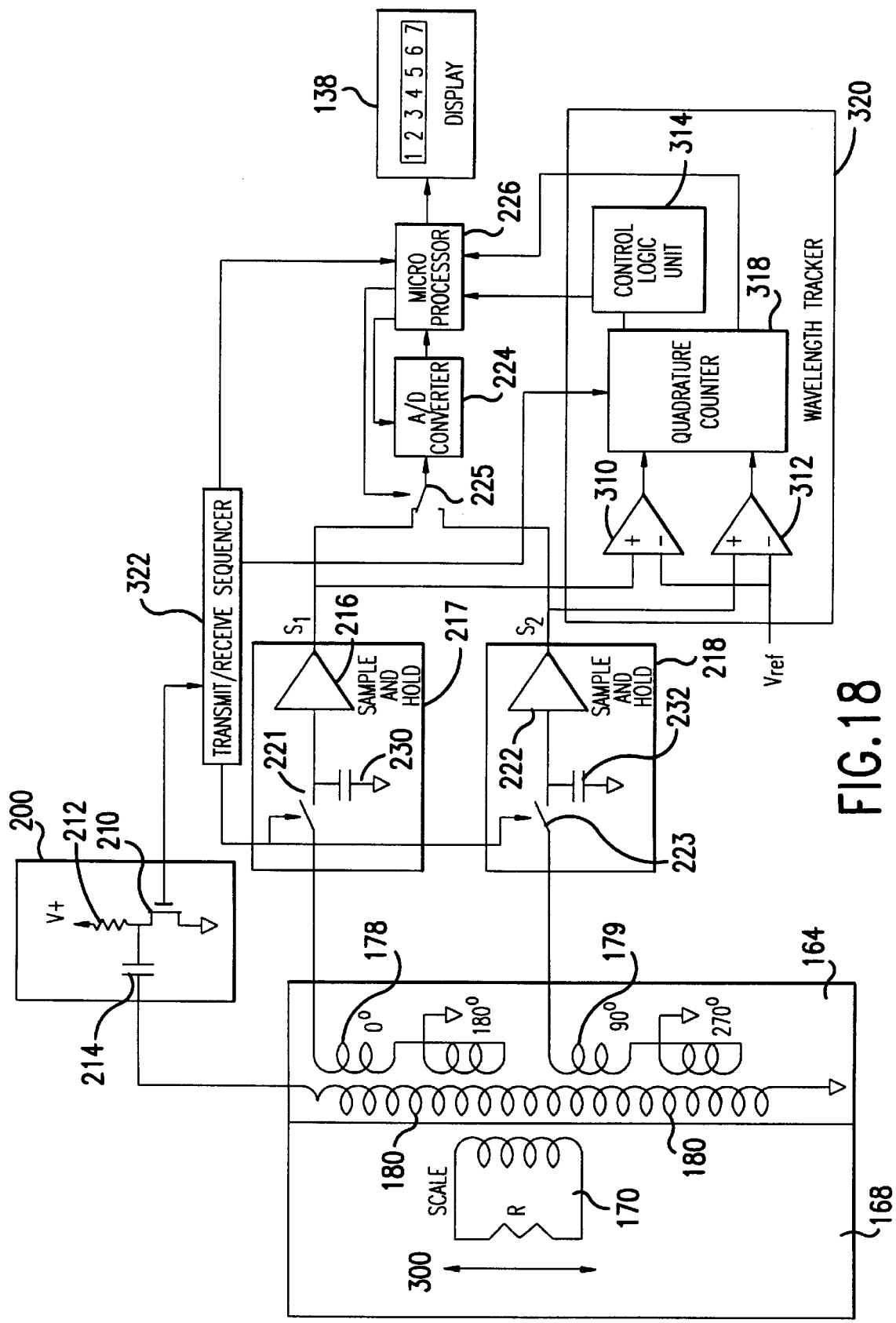
FIG. 18 is a block diagram of encoder electronics of the electronic linear scale, incorporating a wavelength tracker.

FIG. 18 shows an example of encoder electronics where a wavelength tracker 320 keeps track of the wavelength number. The wavelength tracker consumes very little power. With a wavelength tracker, the microprocessor 226 can go into a sleep mode when it is not performing a high resolution position measurement and thus not updating the display 138, thereby saving power. A transmit/receive sequencer 322 generates the control signals for the signal generator 200 and the sample-and-hold circuits 217 and 218 by conventional circuit means. The transmit/receive sequencer 322 also generates a strobe pulse for the wavelength tracker 320 and outputs a display update control signal to the microprocessor 226.

The wavelength tracker 320 includes two analog comparators 310 and 312, a quadrature counter 318, and a control logic unit 314. The comparators 310 and 312 detect the zero crossings of the signals $S_1$ and $S_2$. A reference voltage $V_{ref}$ is input to each of the comparators 310 and 312. The output states of the comparators are read into a quadrature counter 318 on command from the wavelength tracker strobe when the outputs of the comparators have stabilized. The quadrature counter 318 counts the number of full wavelengths traveled. The quadrature counter 318 is an up/down counter. The quadrature counter 318 detects the direction of movement of the slider assembly 120 because the signals $S_1$ and $S_2$ are in quadrature. That is, because these signals are phase shifted 90° relative to each other. The quadrature counter 318 is a circuit well known in the art. Quadrature counters are, for instance, commonly used to detect the position of optical rotary encoders and linear scales.

Where the integer wavelength count of the wavelength tracker 320 differs from that of the microprocessor 226, the electronic linear scale uses the count of the wavelength tracker 320 rather than of the microprocessor 226. For measurements or increments less than a wavelength however, the microprocessor has priority.

The control logic unit 314 shifts the microprocessor 226 between sleep and active modes at appropriate times, for example when the slider assembly 120 is moving quickly as described above. The control logic unit 314 also can be used to shift the microprocessor 226 from the active mode to the sleep mode when the slider 120 has not moved for a specified time period. Subsequently, the control logic unit 314 can also be used to shift the microprocessor 226 from the sleep mode to the active mode when the slider 120 begins to move. Those skilled in the art will recognize other ways in which the control logic unit 314 can be used to appropriately shift the microprocessor 226 between active and sleep modes in order to reduce power consumption.

Debounce logic (not shown) is also included within the wavelength tracker to prevent erroneous measurements due to edge jitter when the slider 120 is near a wavelength or quadrature transition. Such debounce logic is well known, and apparent to those of ordinary skill in the art.

Figure 19:
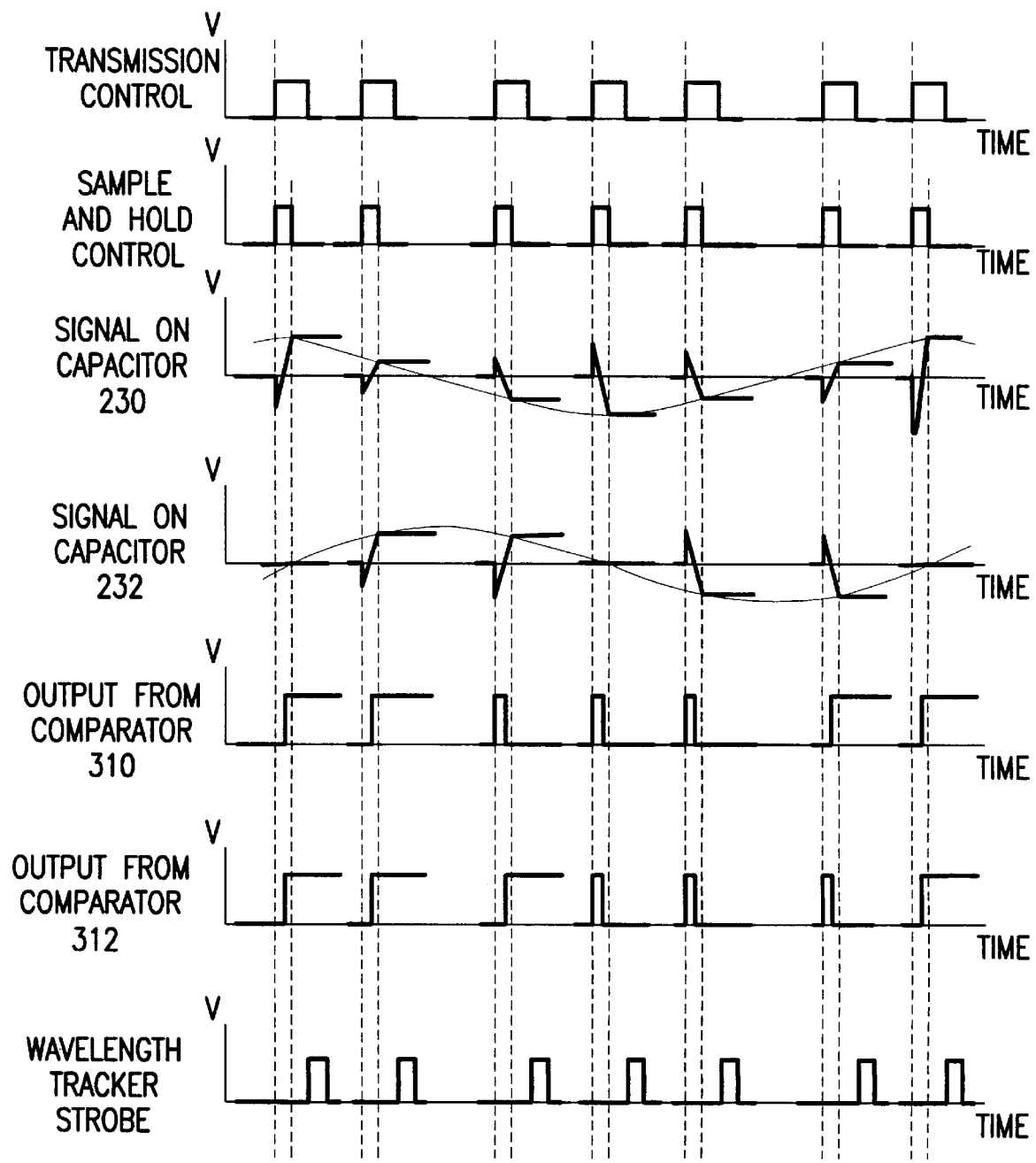
FIG. 19 is a signal timing diagram showing voltages at selected locations in the encoder electronics of FIG. 18 during sampling.
Figure 20:
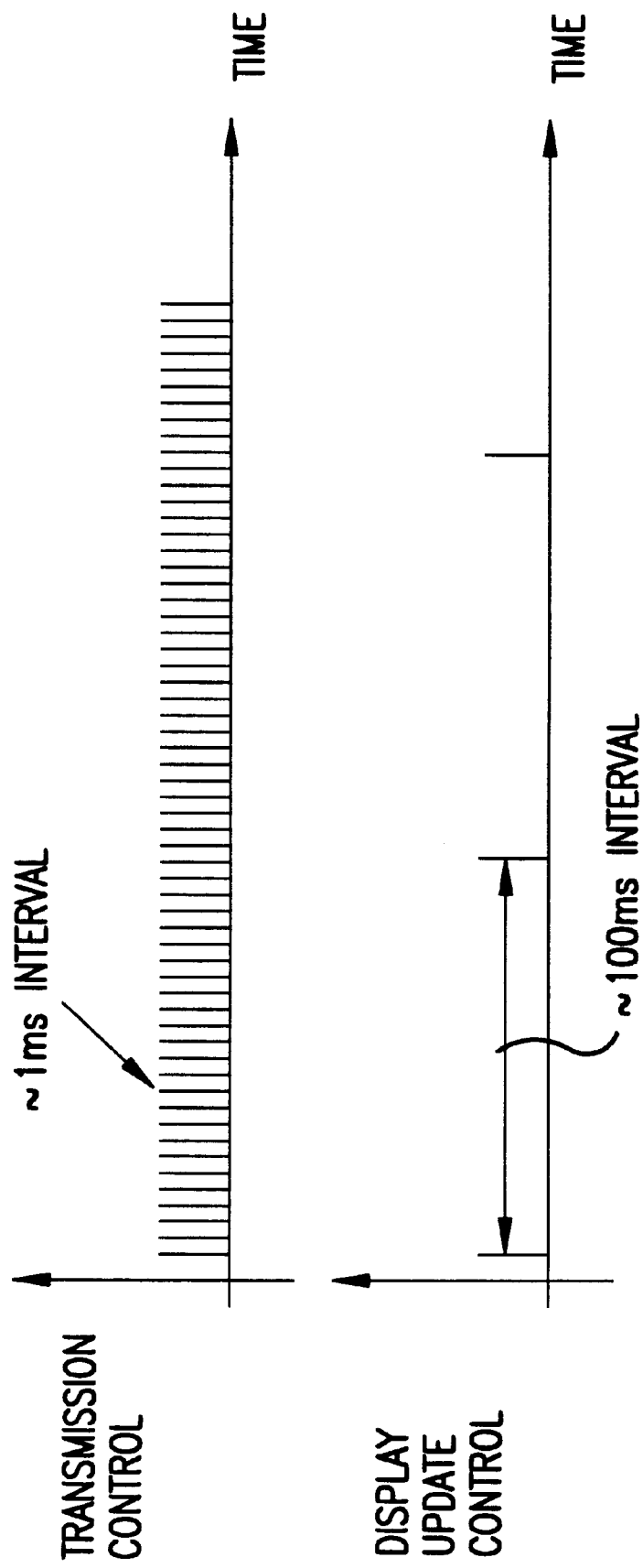
FIG. 20 is a signal diagram showing timing of signals at selected locations in the encoder electronics of FIG. 18.

FIG. 19 shows a signal timing diagram of the signals output from the transmit/receive sequencer 322, and associated signals. FIG. 20 shows the transmission control signal and the display update control signal.

When the microprocessor 226 updates the display 138 (for example, 10 times per second) it calculates the number of wavelengths traveled from the "zero" position. It reads the number of full wavelengths traveled from the quadrature counter 318. The microprocessor 226 then calculates the fractional wavelength traveled based on the signals $S_1$ and $S_2$. (The signals $S_1$ and $S_2$ have earlier been converted to digital signals by the A/D converter 224.) The fractional wavelength is added to the number of full wavelengths and the result is multiplied by the wavelength to obtain the position value fed to the display.

The transmit/receive sequencer 322 controls sampling of the transducer signals and the wavelength tracker counts the number of wavelengths traveled, without any help from the A/D converter 224 or microprocessor 226. In this embodiment, the linear scale is made "quasi-absolute" by turning off only the microprocessor 226, the A/D converter 224, and the display 138 when the linear scale is turned off, so that the sampling circuits and the wavelength tracker 318 are still active. While the linear scale was turned off, the wavelength tracker remained active. Thus, the wavelength tracker provides information regarding the wavelength at which the linear scale is positioned, even if the position was moved during the time the linear scale was turned off. Thus, when the linear scale is turned back on, the position of the linear scale can be computed and displayed with reference to the original "zero" position, despite the fact that the high resolution measurement and display functions of the linear scale were turned off.

Figure 21:
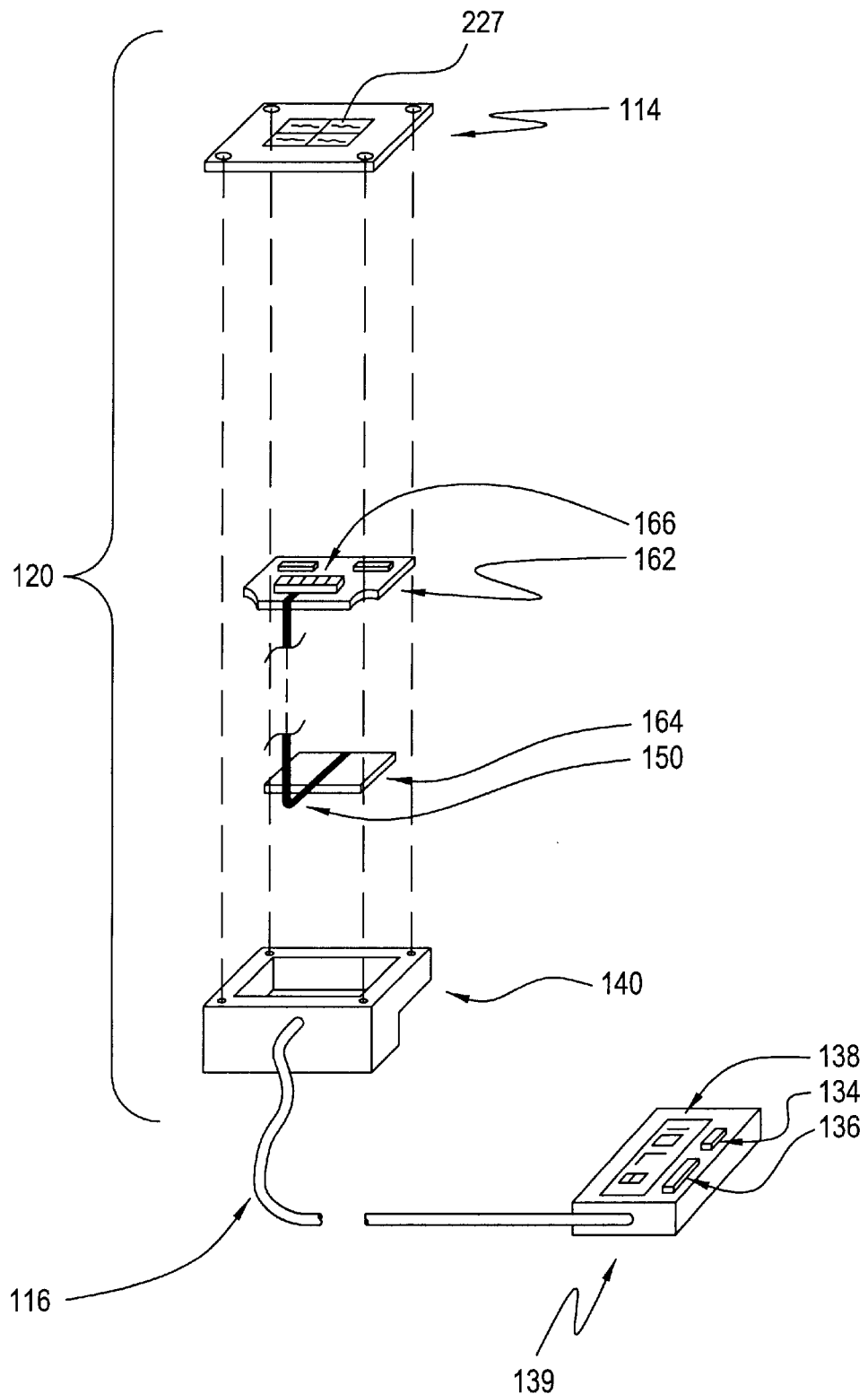
FIG. 21 is an exploded isometric view of a third preferred embodiment of the electronic linear scale of this invention.
Figure 22:
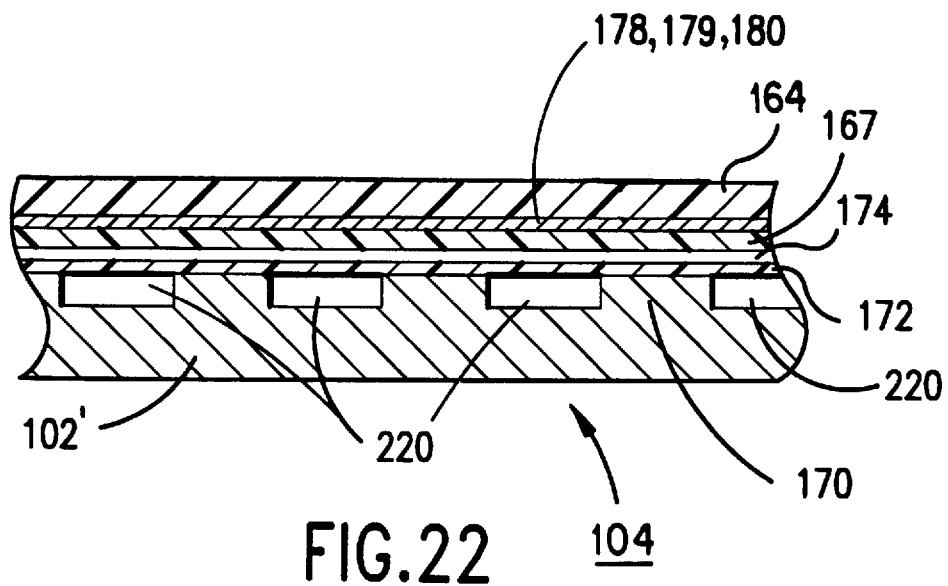
FIG. 22 is a side cross-sectional view along a line perpendicular to the line a—a of FIG. 1, of a portion of an alternative embodiment of the linear scale showing topographically formed disrupters.

FIGS. 21 and 22 show a third preferred embodiment of the electronic linear scale 100 of this invention.

In this third preferred embodiment, the disrupters 170 are integrally formed in a conductive beam 102', as shown in FIG. 22. The upper surface of the conductive beam 102' is etched or machined to form evenly spaced grooves 220, leaving raised portions of the conductive beam 102'. The upwardly projecting raised portions of the conductive beam 102' thus form the disrupters 170. An insulative layer 172 is formed over the upper surface of the conductive beam 102' and covers the disrupters 170 and the grooves 220. An air gap 174 is provided between the insulative coating 167 of the read head 164 and the insulative layer 172. The size of the air gap 174 is preferably the same as in the first preferred embodiment, i.e., on the order of 0.5 mm.

As shown in FIG. 21, power for operating the linear scale 100 can be drawn from a conventional solar cell 227 mounted in the cover 114, with power routed to the signal processing electronics 166 by conventional means (not shown). A transparent protective cover for the solar cell (not shown) is preferred. The conventional solar cell 227 is a commercially available component and supplies adequate power to operate the low power inductive transducer linear scale 100. Alternately, the solar cells can be mounted on digital display unit 139. This removes them from the higher contaminant concentration around the slider assembly 120.

Figure 23:
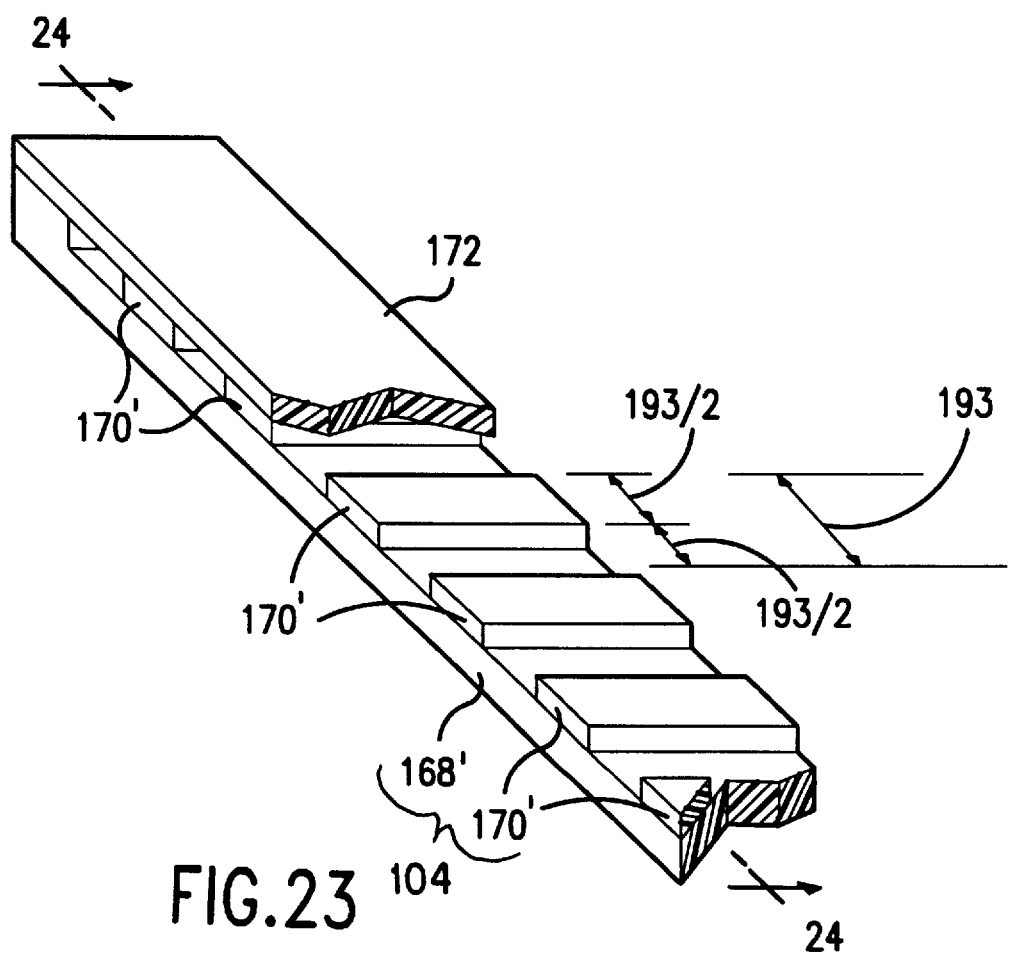
FIG. 23 is an isometric view of the scale of a fourth preferred embodiment of the linear scale of this invention, using enhancer-type modulators.
Figure 24:
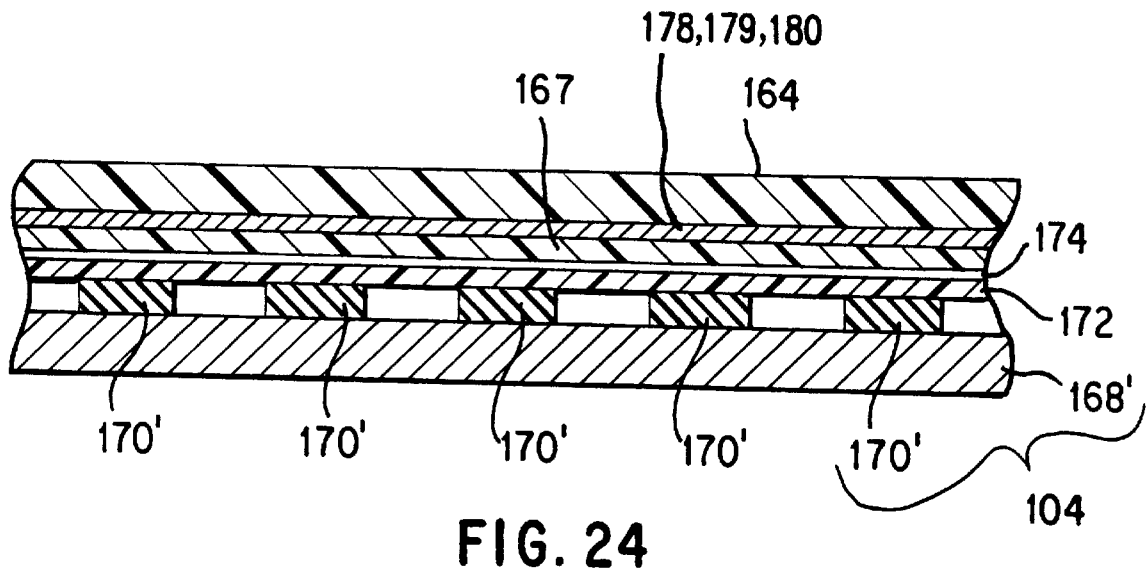
FIG. 24 is a side cross-sectional view of the scale of FIG. 23 taken along the line 24—24 of FIG. 23 showing the enhancers carried by the base.

The first, second and third preferred embodiments of the linear scale 100, as described above, include flux disrupters 170 to interact with the read head 164 to provide the measurement signal. In a fourth preferred embodiment, as shown in FIGS. 23 and 24, flux enhancers 170' are used in place of the flux disrupters 170. A flux enhancer 170' "enhances" or increases the magnetic flux through the adjacent portions of the receiver windings 178 and 179.

Except as noted below, the fourth preferred embodiment of the linear scale 100 shown in FIGS. 23 and 24 can use any of the read head geometries, circuits and mechanical configurations disclosed in the first, second or third preferred embodiments. In all cases, it should be understood that when a flux enhancer 170' is used in place of a flux disrupter 170, the magnetic field will be enhanced rather than disrupted.

That is, the flux density is increased and the polarity of the resulting signals will be inverted when the flux enhancers 170' are used, relative to the effects generated when the flux disrupters 170 are used. In either case, the flux enhancer 170' or flux disrupter 170 spatially modulates the magnetic flux.

The enhancement-type linear scale 100 shown in FIGS. 23 and 24 enhances the magnetic flux by moving an object of high magnetic permeability, such as ferrite, close to the read head 164. The flux enhancers 170' provide a lower reluctance path for the varying magnetic field generated by the transmitter winding 180. As a result, the magnetic flux that the receiver windings 178 and 179 receive is altered or enhanced in the vicinity of the flux enhancers 170'. This causes the receiver windings 178 and 179 to output non-zero EMF signals.

Consequently, if the flux enhancers 170' each have a length equal to ½ of the wavelength 193, the signal measured at the output terminals 185–188 of the receiver windings 178 and 179 will change polarity and amplitude as the flux enhancers 170' move between the "+" and "−" loops 191a and 191b of receiver winding 178 and 192a and 192b of receiver winding 179. Thus, the enhancement-type linear scale 100 of the fourth preferred embodiment operates in a manner completely analogous to the above described signal behavior resulting from the disrupters 170 used in the first, second and third preferred embodiments of the linear scale 100.

If high permeability objects such as the enhancers 170' are moved relative to the read head 164, the regions of higher flux density through the receiver windings 178 and 179 interact with successive ones of the loops 191 and 192. The AC amplitude of the signal output from the receiver windings 178 and 179 will depend upon the difference between the area of the "+" loops 191a and 192a overlapped by the flux enhancers 170' and the area of the "−" loops 191b and 192b overlapped by the flux enhancers 170'.

As the flux enhancers 170' travel along the measuring axis 300, the AC amplitudes of the signals output from the receiver windings 178 and 179 vary continuously due to the continuous relationship between the overlapped areas of the "+" loops 191a and 192a and the overlapped areas of the "−" loops 191b and 192b. The signals will also vary periodically with the wavelength 193 due to the periodically alternating "+" and "−" loops 191a and 191b of the receiver winding 178 and 192a and 192b of receiver winding 179, as shown in FIG. 4, and the dimension and placement of the flux enhancers 170'.

The signals output from the receiver windings 178 and 179 have smooth, continuous, sinusoidal shapes based on the movement of the flux enhancers 170' relative to the receiver windings 178 and 179. Continuous signals enable the linear scale 100 to make accurate position readings over extended distances.

In the fourth preferred embodiment of the linear scale 100 shown in FIGS. 23 and 24, the scale 104 includes multiple flux enhancers 170' positioned on and spaced apart along the substrate 168'. The flux enhancers 170' are rectangular members having high magnetic permeability. The flux enhancers 170' are preferably formed from a non-conductive, e.g., highly resistive material, such as ferrite. The flux enhancers 170' are also non-magnetized, so that they do not attract ferromagnetic particles.

The substrate 168' is preferably formed from a material having a substantially lower magnetic permeability than the material of the flux enhancers 170'. Similarly to the flux disrupters 170, the flux enhancers 170' preferably have a length equal to one-half of the wavelength 193 and are arranged at a pitch equal to one wavelength 193. The thickness of the flux enhancers 270' is preferably on the order of 1.5 mm. The resulting signal strength is comparable to that of a disrupter-type linear scale 100.

Although the flux enhancers 170' can be thicker or thinner than 1.5 mm, thicker flux enhancers 170' will provide a greater signal strength. The actual thickness of the flux enhancers 170' will be determined by the tradeoff between the desired signal strength and the material and manufacturing costs.

The substrate 168' is preferably non-conductive, as in the first and second preferred embodiments. However, the substrate 168' may be more or less conductive depending on manufacturing considerations. The flux enhancers 170' are shown in FIGS. 23 and 24 as formed from a material separate from the beam 102 and the substrate 168'. However, as in the third preferred embodiment of the linear scale 100, the flux enhancers 170' can be integrally formed with the beam 102'. In this case, the flux enhancers 170' will be formed by processes that alter the permeability of the portions of the material of the beam 102' that form the flux enhancers 170'.

Figure 25:
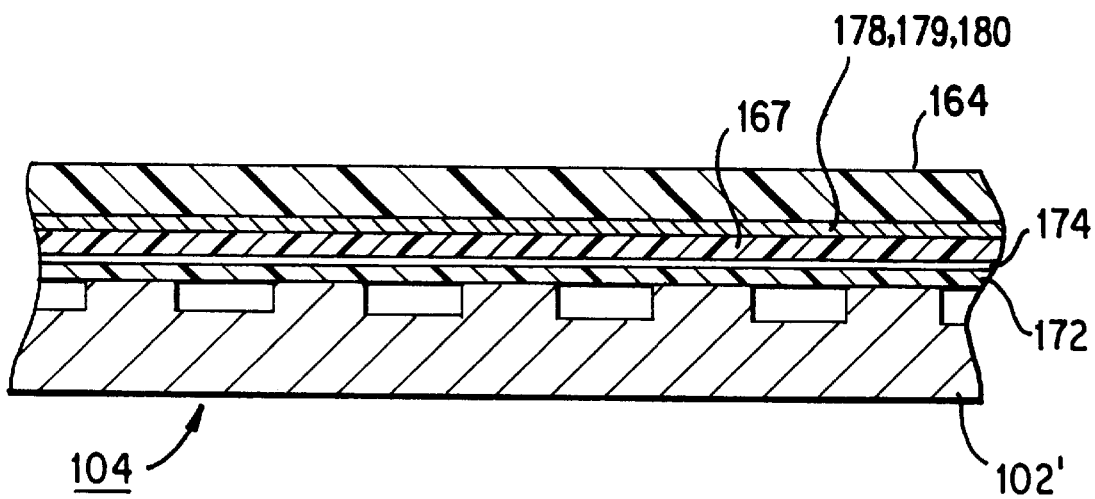
FIG. 25 is a cross-sectional view of the scale of a fifth preferred embodiment of the linear scale of this invention.

As shown in FIG. 25, in a fifth preferred embodiment of the linear scale 100, the flux enhancers 170' are formed as raised or protruding portions of the beam 102'. Preferably a surface contouring process is used to form the protruding portions. Thus, as in the third preferred embodiment of the linear scale 100 shown in FIG. 22, flux modulators are integrally formed from the same material as the beam 102'. However, in this case, they are flux enhancers 170'.

The close proximity of the flux enhancers 170' to the read head 164 decreases the magnetic path reluctance for the magnetic flux in the vicinity of the flux enhancers 170'. This effect is comparable to the permeability variation between the substrate 168', the flux enhancers 170' and the empty spaces in the fourth preferred embodiment shown in FIGS. 23 and 24. This allows the fifth preferred embodiment of the linear scale 100 to operate substantially similarly to the fourth preferred embodiment of the linear scale 100 of FIGS. 23 and 24.

Figure 26:
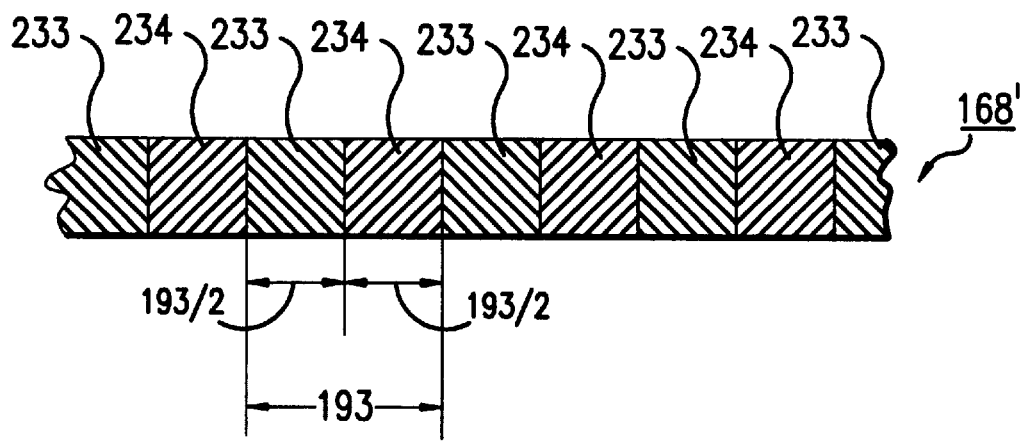
FIG. 26 is a plan view of the scale of a sixth preferred embodiment of the linear scale of this invention.

In a sixth preferred embodiment of the linear scale 100, as shown in FIG. 26, the beam 102' (or the substrate 168') includes a plurality of less magnetically permeable segments 233, such as alumina, alternating with a plurality of high-permeability, highly resistive segments 234, such as ferrite. The beam 102' or the substrate 168' is thus formed by the series of alternating segments 233 and 234 bonded to form an alternating stack of material. The relatively more magnetically permeable, non-conductive segments 234 define the flux enhancers 170' and provide a lower reluctance path than the less magnetically permeable segments 233.

It should be appreciated that the less magnetically permeable segments 233 can be formed from a conductive material, for example, copper or brass. In this case, the less magnetically permeable segments are also disrupters 170. Therefore, the beam 102' or the substrate 168' includes two types of flux modulators: the flux disrupters 233' and the flux enhancers 234.

Figure 27:
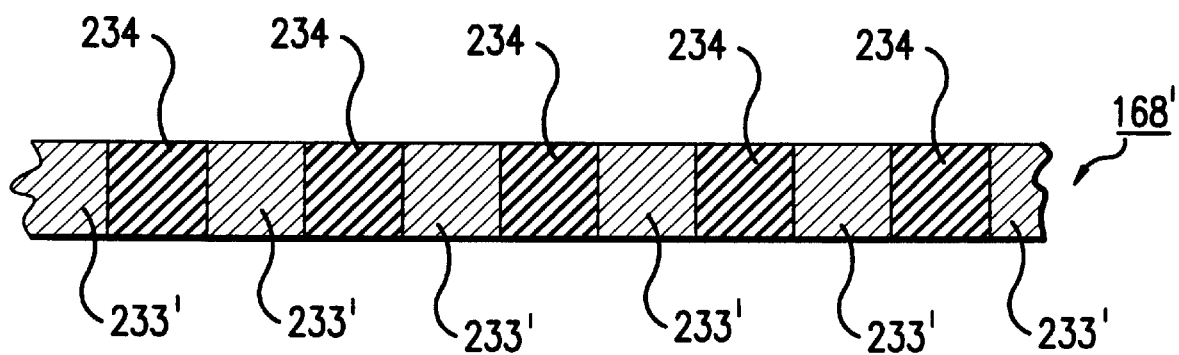
FIG. 27 is a side cross-sectional view of the scale of a seventh preferred embodiment of the linear scale of this invention.

Thus, the flux enhancers 170' (234) and the flux disrupters 170 (233') can be alternately placed along the surface of the beam 102' or the substrate 168', as shown in FIG. 27. In this seventh preferred embodiment of the linear scale 100, the effects on the receiver signals caused by the disrupters 170 (233') and the enhancers 170' (234) will be roughly additive, producing a stronger signal than when either type of flux modulator is used alone.

Figure 28:
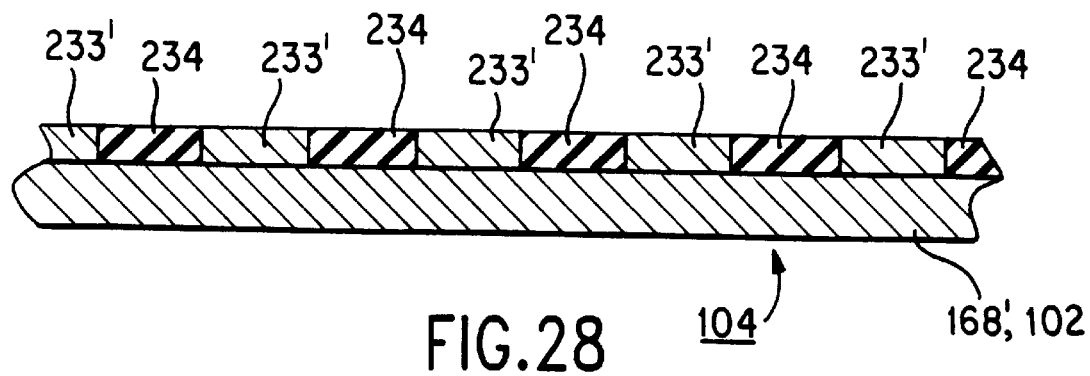
FIG. 28 is a side cross-sectional view of the scale of an eighth preferred embodiment of the linear scale of this invention.
Figure 29:
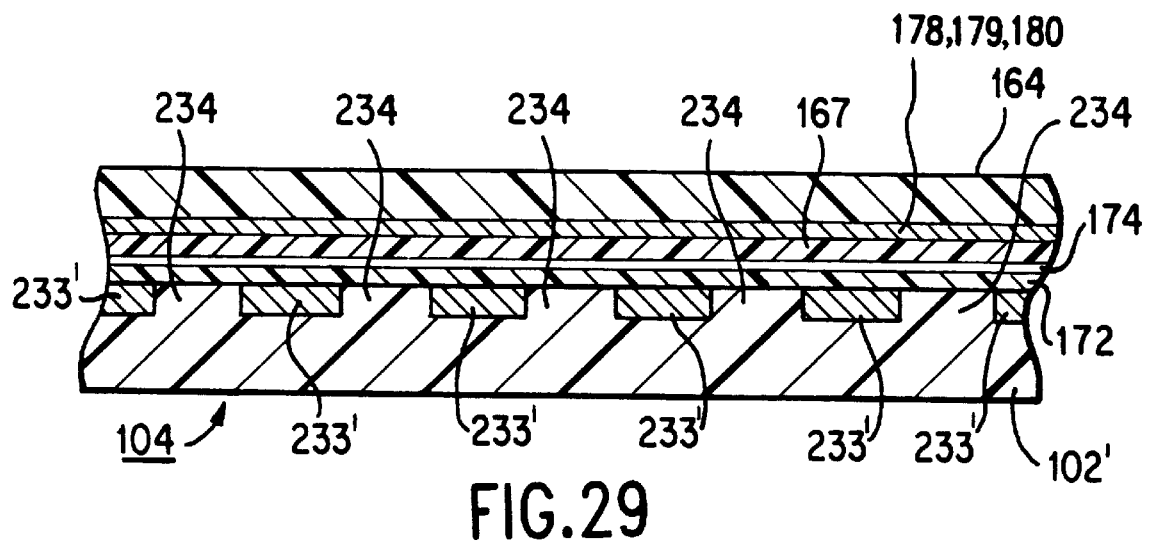
FIG. 29 is a side cross-sectional view of a first variation of the scale of the eighth preferred embodiment of the linear scale of this invention.
Figure 30:
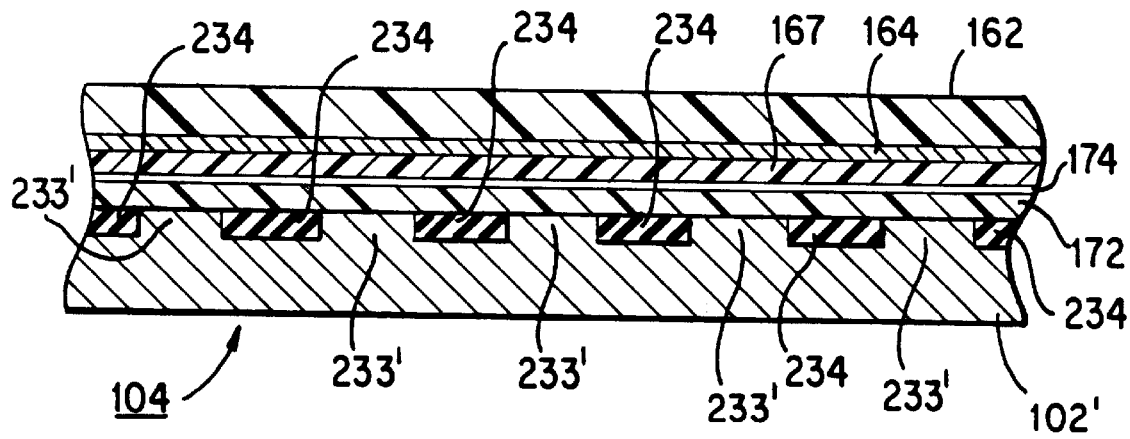
FIG. 30 is a side cross-sectional view of a second variation of the scale of the eighth preferred embodiment of the linear scale of this invention.

FIG. 28 shows the flux disrupters 170 (233') and the flux enhancers 170' (234) can be provided on a base 102' or on the substrate 168'. Additionally, as in the third or fifth embodiments, the flux disrupters 170 (233') or the flux enhancers 170' (234) can be provided integrally with the base 102' or the substrate 168', as shown in FIGS. 29 and 30. In this case, the other of the flux disrupters 170 (233') and the flux enhancers 170' (234) are inserted into the grooves 220.

All of the geometric design principles and circuits disclosed above for the flux-disrupter type linear scales of the first, second and third preferred embodiments can of course be used with the flux-enhancement type linear scales 100 of the fourth-seventh preferred embodiments to produce the high accuracy and other benefits the first-third preferred embodiments of the linear scale 100 provide. The various read head geometries described above, as well as the circuits and mechanical configurations disclosed above, can all be employed to provide substantial accuracy improvements to prior art "enhancer-type encoders" when the flux enhancers 170' are substituted for the flux disrupters 170. The low-power circuit techniques described above can also be used with the flux enhancers 170' while retaining their low-power benefits.

Although specific embodiments of, and examples for, this invention have been illustratively described, various equivalent modifications can be made without departing from the spirit and scope of this invention. For example, while sinusoidal loops 191 and 192 are shown and described with respect to the receiver windings 178 and 179, various other geometries can be effectively used, including different geometries for different phases in a given read head.

Similarly, while generally rectangular conductive bars and rectangular high permeability bars are shown and described herein as two types of spatial flux modulators, other geometries can be used. When these geometries lead to non-sinusoidal output signals as a function of displacement, then the actual function can be modeled in a look-up table, or by other means known to those skilled in the art. The position calculating equations described herein can be similarly modified or replaced according to well-known signal processing techniques.

Those skilled in the art will also recognize that the sampling frequency can be chosen to be higher or lower than that described above, depending upon the desired accuracy and a maximum expected rate of change in the distance being measured.

Also, the signal processing and display electronic circuit 166 described herein includes only exemplary analyzing circuits. One skilled in the art will recognize that other circuits may be used to drive the transmitter winding 180 and to detect signals from the receiver windings 178 and 179. Also, one skilled in the art will recognize that, due to the symmetry of the electromagnetic principles disclosed above, the operating role of transmitter winding 180 and receiver windings 178 and 179 can be reversed, as outlined above.

Those skilled in the art will further recognize that the electronic components handling the high frequency signals are preferably located as close as possible to the transducer, while the electronics handling the low frequency signals can be more remotely located from the transducer. The high frequency electronics include, for example, the circuits used to drive the transmitter windings and to detect the signals from the receiver winding. The low frequency electronics include, for example, those circuits downstream of the sample and hold circuit. In particular, when the transducer excitation frequency is 1MHz or greater, at least the signal generating circuits and the demodulating circuits should be positioned very close to (or optionally, on) the read head 164. Likewise, locating the sample and hold circuitry on the read head 164 may be desirable.

Accordingly, the present invention is not limited by the disclosure, but instead, its scope is to be determined entirely by reference to the following claims.

What is claimed is:

1. An electronic inductive linear scale comprising:

a first member;

an elongated beam having a measuring axis, the first member movable relative to the elongated beam along the measuring axis;

a low power energy supply source providing a power supply to a drive circuit;

the drive circuit inputting the power supply and outputting an intermittent drive signal;

an inductive transducer comprising a first portion mounted on one of the elongated beam and the first member and a second portion mounted on the other of the elongated beam and the first member, the inductive transducer inputting the intermittent drive signal and outputting at least one sensed signal responsive to a relative position of the first member on the elongated beam; and an analyzing circuit inputting the at least one sensed signal and outputting an output signal responsive to the position of the first member on the elongated beam at a first level of resolution.

2. The electronic linear scale of claim 1, wherein the drive circuit comprises a capacitor discharged through the inductive transducer.

3. The electronic linear scale of claim 2, wherein the capacitor and the inductive transducer form a resonant circuit.

4. The electronic linear scale of claim 3, wherein the capacitor is disconnected from the inductive transducer in close proximity to a resonant peak of the resonant circuit.

5. The electronic linear scale of claim 1, wherein the analyzing circuit comprises a counter for counting fractions of cycles of the at least one sensed signal outputted from the inductive transducer in response to motion of the first member along the elongated beam at a second level of resolution coarser than the first level of resolution, the counter providing an approximate relative position of the first member on the elongated beam.

6. The electronic linear scale of claim 5, wherein the counter is responsive at spatial intervals of at most ¼ cycle.

7. The electronic linear scale of claim 1, wherein:
the first portion of the inductive transducer comprises:
at least one magnetic field generator, each magnetic field generator generating a changing magnetic flux in a flux region in response to the drive signal, and
at least one magnetic flux sensor, each magnetic flux sensor positioned within the flux region and sensing the magnetic flux in the flux region, each magnetic flux sensor generating one of the at least one sensed signals; and
the second portion of the inductive transducer comprises at least one flux modulator, each flux modulator positionable within the flux region and capable of altering a magnetic flux within a modulation region proximate to the flux modulator;
wherein each sensed signal is indicative of a relative position between the magnetic flux sensor and the at least one flux modulator based on the sensed magnetic flux.

8. The electronic linear scale of claim 7, wherein at least one of a) each magnetic flux sensor, and b) each magnetic field generator, is formed in an alternating pattern of polarity regions.

9. The electronic linear scale of claim 8, wherein the alternating pattern of polarity regions comprises sinusoidally shaped areas bounded by conductive elements.

10. The electronic linear scale of claim 7, wherein in the absence of the at least one flux modulator, the output signal generated by each magnetic flux sensor is insensitive to the changing magnetic flux generated by each magnetic field generator.

11. The electronic linear scale of claim 7, wherein each of the at least one flux modulator comprises one of a) a flux disrupter and b) a flux enhancer.

12. The electronic linear scale of claim 7, wherein each magnetic field generator includes a field generating conductor and each magnetic flux sensor includes a sensing conductor, the field generating conductor of each magnetic field generator and the sensing conductor of each magnetic flux sensor positioned within a thin zone.

13. The electronic linear scale of claim 7, wherein each magnetic field generator and each magnetic flux sensor form a continuous spatially modulated inductive coupling.

14. The electronic linear scale of claim 1, wherein a magnetic field of the inductive transducer changes at a rate equivalent to an oscillation frequency of at least 1 MHz in response to the intermittent drive signal.

15. The electronic linear scale of claim 1, wherein the intermittent drive signal comprises at least one pulse signal.

16. The electronic linear scale of claim 1, wherein:
the at least one pulse signal comprises a train of pulse cycles; and
the analyzing circuit determines changes in the relative position at a coarse level of resolution during each pulse cycle, and determines the relative position at a finer level of resolution once during a plurality of the pulse cycles.

17. The electronic linear scale of claim 1, wherein the electronic linear scale draws at most an average current of 200 $\mu$A.

18. The electronic caliper of claim 1, wherein the energy supply source is a self-contained, low-power energy supply source.

19. The electronic linear scale of claim 18, wherein the low-power energy supply source is at least one of a battery and a solar cell.

20. The electronic inductive linear scale of claim 1, wherein energy is conserved by creating a resonant circuit between a capacitor and a magnetic field generator of the inductive transducer and disconnecting the capacitor in close proximity to a resonant peak of the resonant circuit.

21. The electronic inductive linear scale of claim 1, wherein an average current of at most 75 $\mu$A is supplied from the power supply to the drive circuit.

22. A method for operating a linear scale, the linear scale comprising:
a scale member having a measurement axis, the scale member mountable on a first mounting member;
a first member mountable on a second mounting member so that the first member is adjacent to the scale member, the first mounting member and the second mounting member movable relative to each other along the measurement axis;
a magnetic flux sensor provided on one of the first member and the scale member;
a flux modulator provided on the other of the scale member and the first member;
a magnetic flux generator provided on one of the first member and the scale member, wherein the magnetic field generator and the magnetic flux sensor form an inductive coupling;
a low-power energy supply source; and
a drive circuit,
the method comprising:
providing a low-power supply signal from the low-power energy supply source to the drive circuit;
intermittently outputting a drive signal to the magnetic flux generator;
producing a changing magnetic flux with the magnetic flux generator in a flux region in response to the intermittent drive signal;
moving the first mounting member relative to the second mounting member to a measurement position which is relative to an established reference position, wherein the flux modulator modulates the inductive coupling between the first member and the scale member corresponding to a relative position between the first mounting member and the second mounting member;
sensing the modulated magnetic flux with the magnetic flux sensor to produce a sensed signal corresponding to the relative position;
monitoring the sensed signal produced by the magnetic flux sensor; and
determining, in response to the monitored sensed signal, a distance between the established reference position and the measurement position.

23. The method of claim 22, wherein the magnetic flux generator is a transmitter winding and the step of producing a changing magnetic flux comprises providing a driving signal to the transmitter winding, the driving signal causing a changing current to flow through the transmitter winding to induce the changing magnetic flux.

24. The method of claim 23, wherein the step of providing a driving signal to the transmitter winding comprises:
producing a series of pulses at a selected pulse interval with a pulse generator to produce a pulsed signal; and
supplying the pulsed signal to an input terminal of the transmitter winding.

25. The method of claim 24, wherein the step of monitoring the sensed signal produced by the magnetic flux sensor includes sampling the sensed signal synchronously with the pulsed signal.

26. The method of claim 25, wherein the step of sampling the sensed signal synchronously with the pulsed signal includes sampling the sensed signal based on an expected time delay between the pulsed signal and a peak in a response of a resonant circuit formed by the pulse generator and the transmitter winding.

27. The method of claim 24, wherein the determining step comprises:
   determining changes in relative position at a coarse level of resolution during each pulse interval; and
   determining the distance between the established reference position and the measurement position at a finer level of resolution once during a plurality of pulse intervals.

28. The method of claim 22, further comprising the step of operating the electronic linear scale at at most an average current draw of 200 $\mu$A.

29. The method of claim 22, wherein the step of producing a changing magnetic flux with the magnetic flux generator includes supplying an average current at at most 75 $\mu$A to the magnetic flux generator.

30. The method for operating an electronic linear scale of claim 22, wherein the magnetic flux generator and the magnetic flux sensor form a continuous spatially modulated inductive coupling, such that, when moving the first mounting member, the flux modulator further modulates the modulated inductive coupling between the slide member and the beam member to provide a continuously changing magnetic flux.

31. The method for operating the linear scale of claim 22, wherein the energy supply source is a self-contained, low-power energy supply source.

32. The method for operating the linear scale of claim 22, wherein the low-power energy supply source is at least one of a battery and a solar cell.

33. An electronic inductive linear scale comprising:
   a first member;
   an scale member having a measuring axis, the first member movable relative to the scale member along the measuring axis;
   at least one magnetic field generator, each magnetic field generator generating a changing magnetic flux in a flux region in response to a drive signal;
   a low-power energy supply source outputting a power supply;
   a drive circuit inputting the power supply and outputting an intermittent drive signal to at least one of the at least one magnetic field generator;
   at least one flux modulator, each flux modulator positionable within the flux region and capable of altering the changing magnetic flux within a modulation region proximate to the flux modulator; and
   at least one magnetic flux sensor, each magnetic flux sensor positioned within the flux region and sensing the changing magnetic flux in the flux region, each magnetic flux generator generating an output signal indicative of a relative position between the magnetic flux sensor and the at least one flux modulator based on the sensed magnetic flux;
   wherein each magnetic field generator and each magnetic flux sensor from a spatially modulated inductive coupling including an alternating pattern of polarity regions, and each output signal varies as a substantially linear function of a total overlapping area, the overlapping area defined by a maximum cross-sectional area of each at least one flux modulator which overlaps both the flux region and an effective area of each at least one magnetic flux sensor when projected normal to an effective plane of the at least one flux sensor, where areas of opposite inductive coupling polarity are defined as areas of opposite sign.

34. The electronic linear scale of claim 33, wherein the area of at least one of a)each magnetic field generator and b)each magnetic flux sensor is sinusoidally modulated at a chosen spatial frequency to define the continuously spatially modulated inductive coupling.

35. The electronic linear scale of claim 33, wherein the total overlapping area varies as a sinusoidal function at a chosen spatial frequency as a function of the relative position.

36. The electronic linear scale of claim 33, wherein the spatially modulated inductive coupling is a continuous spatially modulated inductive coupling.

* * * * *